US011106341B1

(12) United States Patent
Koum et al.

(10) Patent No.: US 11,106,341 B1
(45) Date of Patent: Aug. 31, 2021

(54) TECHNIQUES FOR MEDIA ALBUM DISPLAY AND MANAGEMENT

(71) Applicant: WhatsApp Inc., Menlo Park, CA (US)

(72) Inventors: Jan Boris Koum, Santa Clara, CA (US); Brian Lange Acton, Palo Alto, CA (US); Randall Sarafa, San Francisco, CA (US); Kuan Loong Yong, Los Altos, CA (US)

(73) Assignee: WHATSAPP LLC, Menlo Park, CA (US)

( * ) Notice: Subject to any disclaimer, the term of this patent is extended or adjusted under 35 U.S.C. 154(b) by 174 days.

(21) Appl. No.: 16/388,907

(22) Filed: Apr. 19, 2019

Related U.S. Application Data

(63) Continuation of application No. 14/734,516, filed on Jun. 9, 2015, now Pat. No. 10,310,719.

(51) Int. Cl.
*G06F 3/0484* (2013.01)
*G06F 3/0488* (2013.01)
*H04W 4/12* (2009.01)
*G06F 3/0485* (2013.01)
*H04L 12/58* (2006.01)
*G06F 3/0482* (2013.01)
*H04M 1/72439* (2021.01)

(52) U.S. Cl.
CPC ........ *G06F 3/04845* (2013.01); *G06F 3/0482* (2013.01); *G06F 3/0485* (2013.01); *G06F 3/04842* (2013.01); *G06F 3/04883* (2013.01); *H04L 51/10* (2013.01); *H04L 51/16* (2013.01); *H04M 1/72439* (2021.01); *H04W 4/12* (2013.01)

(58) Field of Classification Search
CPC ............. G06F 3/04845; G06F 3/04842; G06F 3/04883; G06F 3/0482; G06F 3/0485; H04M 1/72555; H04L 51/16; H04L 51/10; H04W 4/12
See application file for complete search history.

(56) References Cited

U.S. PATENT DOCUMENTS

| 2006/0059436 | A1 | 3/2006 | Nurmi |
| 2009/0292989 | A1 | 11/2009 | Matthews et al. |
| 2012/0096361 | A1 | 4/2012 | Osten |
| 2015/0033151 | A1* | 1/2015 | Lim ................... G06F 3/04817 715/753 |
| 2017/0024098 | A1* | 1/2017 | Doherty ................. G11B 27/11 |

* cited by examiner

*Primary Examiner* — Andrey Belousov
(74) *Attorney, Agent, or Firm* — Kacvinsky Daisak Bluni PLLC

(57) ABSTRACT

Techniques for media album display and management are described. An apparatus may comprise a messaging component operative to receive a plurality of messaging packages from a messaging server and determine a plurality of visual media items referenced by the plurality of messaging packages; a media layout component operative to determine a visual media item layout; and a display component operative to display the plurality of visual media items based on the visual media item layout Other embodiments are described and claimed.

20 Claims, 24 Drawing Sheets

900

Receive a plurality of messaging packages from a messaging server.
902

Determine a plurality of visual media items referenced by the plurality of messaging packages.
904

Determine a visual media item layout.
906

Display the plurality of visual media items based on the visual media item layout.
908

Receive a plurality of messaging packages from a messaging server.
*962*

Determine a plurality of visual media items referenced by the plurality of messaging packages.
*964*

Display a first visual media item of the plurality of visual media items in a user interface.
*966*

Receive a user scroll of the user interface.
*968*

Replace the first visual media item in the user interface in response to the user scroll.
*970*

TECHNIQUES FOR MEDIA ALBUM DISPLAY AND MANAGEMENT

RELATED APPLICATIONS

This application is a continuation of, claims the benefit of and priority to previously filed U.S. patent application Ser. No. 14/734,516 filed Jun. 9, 2015, titled "TECHNIQUES FOR MEDIA ALBUM DISPLAY AND MANAGEMENT", which is hereby incorporated by reference in its entirety.

BACKGROUND

Users may interact with each other in a messaging service, sending messages back and forth to each other in a text-based conversation between two or more users. A user may have a user account associated with them in the messaging service, the user account providing an online identity for the user, a destination for messages directed to the user, and generally coordinating the user's access to and use of the messaging service. A user may access the messaging service from a variety of endpoints, including mobile devices (e.g., cellphones), desktop computers, web browsers, specialized messaging applications, etc. A user may use the messaging service to exchange pictures.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for media album display and management. Some embodiments are particularly directed to techniques to dynamically group, display, and offer user controls for media items received separately for the display and management of media albums.

In one embodiment, for example, an apparatus may comprise a messaging component operative to receive a plurality of messaging packages from a messaging server and determine a plurality of visual media items referenced by the plurality of messaging packages; a media layout component operative to determine a visual media item layout; and a display component operative to display the plurality of visual media items based on the visual media item layout.

In another embodiment, for example, an apparatus may comprise a messaging component operative to receive a plurality of messaging packages from a messaging server; and determine a plurality of visual media items referenced by the plurality of messaging packages; a display component operative to display a messaging thread user interface; display a first visual media item of the plurality of visual media items in the messaging thread user interface; and replace the first visual media item in the messaging thread user interface in response to a horizontal swipe; and a user interface component operative to receive the horizontal swipe of the first visual media item.

In another embodiment, for example, an apparatus may comprise a messaging component operative on the processor circuit to receive a plurality of messaging packages from a messaging server and determine a plurality of visual media items referenced by the plurality of messaging packages; a display component operative to display a first visual media item of the plurality of visual media items in a user interface and replace the first visual media item in the user interface in response to a user scroll; and a user interface component operative to receive a user scroll of the user interface.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 9A illustrates an embodiment of a first logic flow for the system of FIG. 1.

FIG. 9C illustrates an embodiment of a first logic flow for the system of FIG. 1.

DETAILED DESCRIPTION

Figure 1:
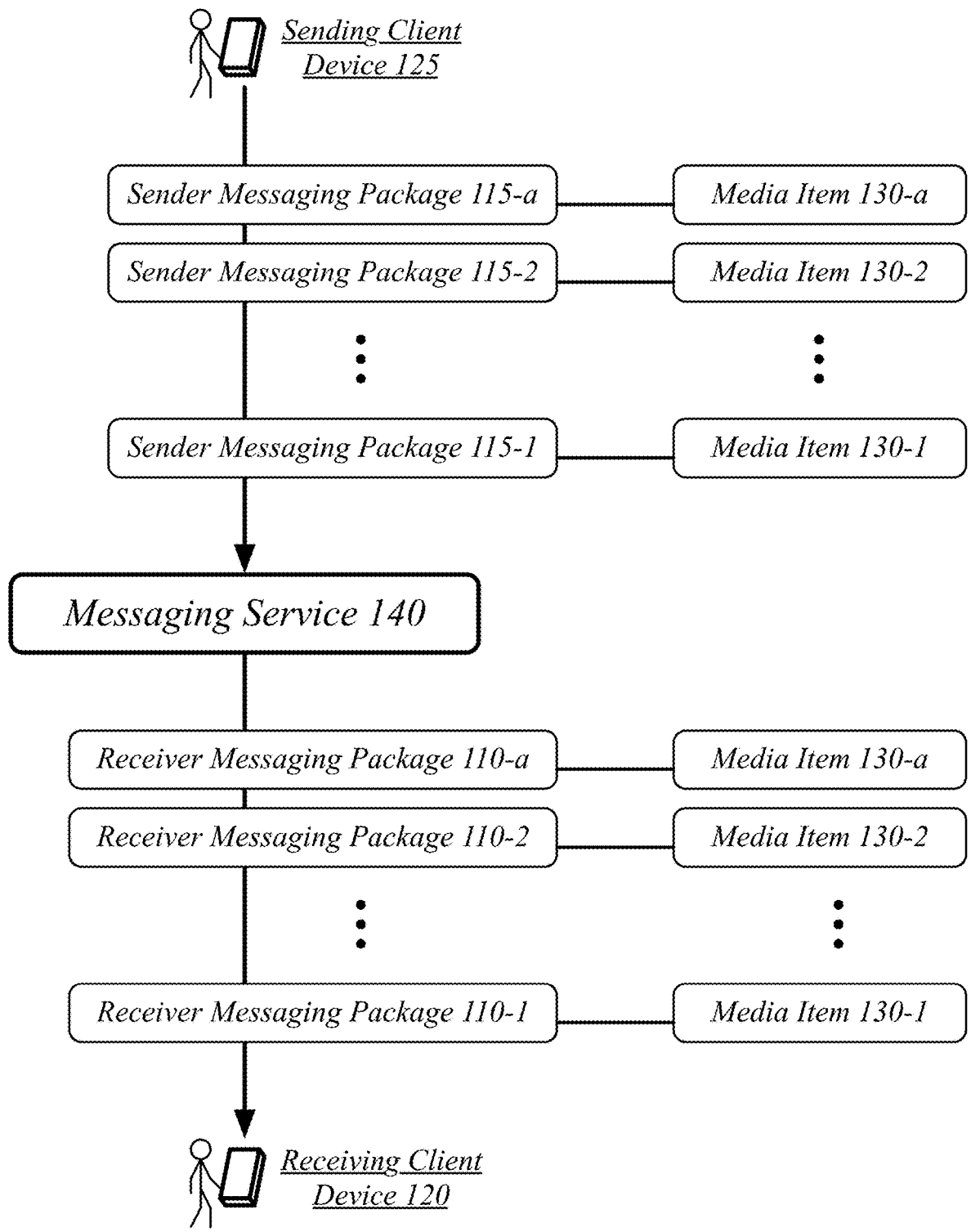
FIG. 1 illustrates an embodiment of a media display system.

Various embodiments are directed to techniques for automatically collecting individually-messaged media items (e.g., images, animated images, videos, sounds) into a unified group that can be collectively manipulated by the user. The display of the media items may combine the media items together using techniques to better communicate their relationship, better highlight the most important media items, and better draw attention to media items shared between friends. Individually-received media items may be manipulated as a group, such as deleting, archiving, or forwarding an entire group of media items with a single command or series of commands (as may include the selection of recipients) instead of individually deleting, archiving, or forwarding each of the media items. As a result, the embodiment can improve the aesthetics and functionality of the display of media items while improving a user's control over the management of media items, including the redistribution of media items through a communications network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a media display system 100. In one embodiment, the media display system 100 may comprise a computer-implemented system having software applications comprising one or more components. Although the media display system 100 shown in FIG. 1 has a limited number of elements in a certain topology, it may be appreciated that the media display system 100 may include more or less elements in alternate topologies as desired for a given implementation.

A messaging service 140 may be generally arranged to receive, store, and deliver messages. The messaging service 140 may store messages while messaging clients, such as may execute on sending client device 125 and receiving client device 120, are offline and deliver the messages once the messaging clients are available.

A receiving client device 120 and sending client device 125 may execute messaging clients for the messaging service 140, wherein each of the client devices 120, 125 and their respective messaging client are associated with a particular user of the messaging service 140. In some embodiments, the client devices 120, 125 may be cellular devices such as smartphones and may be identified to the messaging service 140 based on a phone number associated with each of the client devices 120, 125. In some embodiments, each messaging client may be associated with a user account registered with the messaging service 140. In general, each messaging client may be addressed through various techniques for the reception of messages. While in some embodiments the client devices 120, 125 may comprise cellular devices, in other embodiments one or more of the client devices 120, 125 may include personal computers, tablet devices, any other form of computing device without limitation.

The sending client device 125 may transmit a plurality of sender messaging packages 115 to the messaging service 140 addressed to the user, user account, or other identifier resolving to the receiving client device 120. The plurality of sender messaging packages 115 may each have been transmitted individually and in sequence to the messaging service 140 by the sending client device 125. Each of the sender messaging packages 115 may reference for inclusion in their message a media item of a plurality of media items 130.

In some embodiments, media items 130 may be included as message data within the sender messaging packages 115. In other embodiments, each of the sender messaging packages 115 may comprise media item reference information describing the media items 130 without including the media items 130 within the sender messaging package 115. In some cases, the messaging service 140 may cache recently-sent media items. Or, even where not, the messaging service 140 may have stored copies of at least some of the media items 130, such as due to them being in-transit to other users of the messaging service 140. As such, in some cases, the sending client device 125 may merely transmit reference information for at least some of the media items 130 without transmitting all of the media items 130 to the messaging service 140, with the reference information communicating that the media items 130 should be delivered to the receiving client device 120 as media messages.

The messaging service 140 may receive the sender messaging packages 115 from the sending client device 125. The messaging service 140 may extract the messaging content from each of the sender messaging packages 115 and recompose them into receiver messaging packages 110. Any text messaging content of each of the sender messaging packages 115 may be duplicated into each of the corresponding receiver messaging packages 110. Any media item reference information may be analyzed to determine whether each of the reference media items 130 are already stored by the messaging service 140. If so, a uniform resource locator (URL) or other resource retrieval reference may be included in the receiver messaging packages 110 corresponding to those media elements that are already stored by the messaging service 140. If not, those media elements not currently stored by the messaging service 140 may be requested for upload from the sending client device 125, received by the messaging service 140, stored by the messaging service 140, and a URL for the received media elements may be generated and included in the respective receiver messaging packages 110. Each of the receiver messaging packages 110 may be transmitted to the receiving client device 120 once its corresponding media item is available for retrieval from the messaging service 140 by the receiving client device 120. The messaging service 140 may receive requests for the media items 130 and transmit the media items 130 to the receiving client device 120 in response to the requests.

The reception of sender messaging packages 115, analysis of the content of sender messaging packages 115, transmission of receiver messaging packages 110, and request of media items 130 may all be performed individually without reference to each other. Some elements of the processing of messaging packages may respect their collective nature, such as where the receiving client device 120 is online and a queue of outgoing messages (i.e., the receiver messaging packages 110) is maintained waiting for the receiving client device 120 to become available. However, in general, each of the messaging packages 110, 115 may be processed individually without respect to the composition of the media items 130 into a group or album by the receiving client device 120. For example, a request to the sending client device 125 to upload one of the media items 130 may not interrupt the transmission of another sender messaging package for which the corresponding media item has already been uploaded or is otherwise available.

In some embodiments, an ordering may be assigned to the messaging packages 110, 115 by the sending client device 120 or the messaging service 140. Where assigned by the sending client device 120, the ordering may be determined based on an order in which text is entered, messages are sent, or media items are selected for transmission. Where assigned by the messaging service 140, the ordering may be determined based on an order in which the sender messaging packages 115 are received by the messaging service 140. In some embodiments, receiver messaging packages 110 may be transmitted to the receiving client device 120 in this defined order so as to maintain a proper reading order for the receiving user. Alternatively, the receiver messaging packages 110 may be transmitted out-of-order, such as when available out-of-order due to the media items 130 being available for sending out-of-order, with the receiving client device 120 reconstructing the correct order based on ordering information (e.g., sequence numbers) contained within each of the receiver messaging packages 110.

In some embodiments, messages may be sent peer-to-peer between users without the use of intervening server devices such as may implement the messaging service 140. In these embodiments the sender messaging packages 115 may be the same as the receiver messaging packages 110.

The media display system 100 may use knowledge generated from interactions between users. The media display system 100 may comprise a component of a social-networking service and may use knowledge generated from the broader interactions of the social-networking service. As such, to protect the privacy of the users of the media display system 100 and/or a larger social-networking service, media display system 100 may include an authorization server (or other suitable component(s)) that allows users to opt in to or opt out of having their actions logged by the media display system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the media display system 100 and other elements of a social-networking service through blocking, data hashing, anonymization, or other suitable techniques as appropriate. For example, while interactions between users of a social-networking service and the social-networking service may be used to learn media content preferences and the relationship between preferences for different pieces of media content, these interactions may be anonymized prior to or as part of the learning process.

Figure 2:
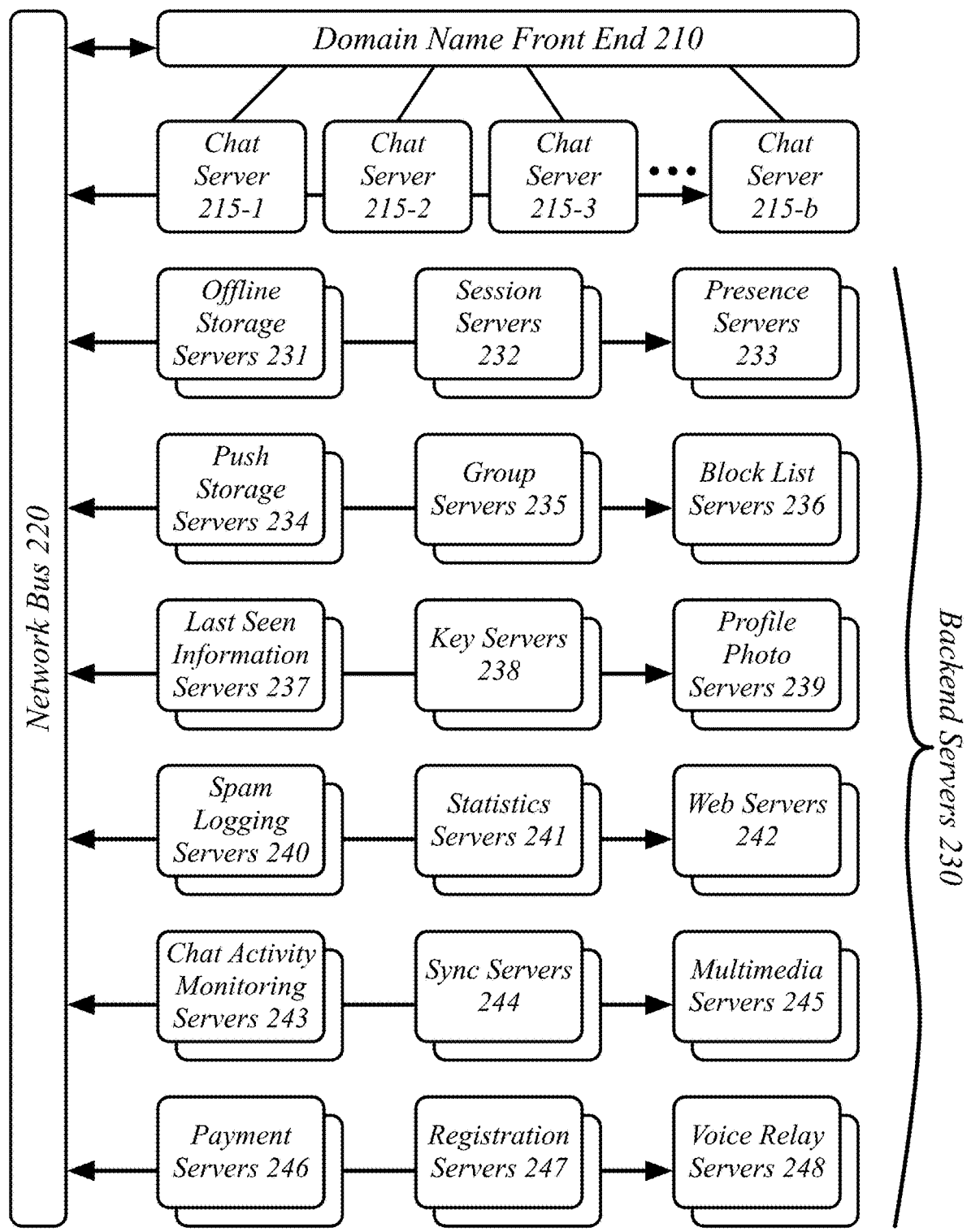
FIG. 2 illustrates an embodiment of a messaging service.

FIG. 2 illustrates an embodiment of a plurality of servers implementing various functions of a messaging service 140. It will be appreciated that different distributions of work and functions may be used in various embodiments of a messaging service 140. The messaging service 140 may comprise the messaging abuse prevention media display system 100 with the operations of the messaging abuse prevention media display system 100 comprising a portion of the overall operations of the messaging service 140.

The messaging service 140 may comprise a domain name front end 210. The domain name front end 210 may be assigned one or more domain names associated with the messaging service 140 in a domain name system (DNS). The domain name front end 210 may receive incoming connections and distribute the connections to servers providing various messaging services.

The messaging service 140 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging service 140 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 140 may comprise one or more offline storage servers 231. The one or more offline storage servers 231 may store messaging content for currently-offline messaging clients in hold for when the messaging clients reconnect.

The messaging service 140 may comprise one or more sessions servers 232. The one or more session servers 232 may maintain session state of connected messaging clients.

The messaging service 140 may comprise one or more presence servers 233. The one or more presence servers 233 may maintain presence information for the messaging service 140. Presence information may correspond to user-specific information indicating whether or not a given user has an online messaging client and is available for chatting, has an online messaging client but is currently away from it, does not have an online messaging client, and any other presence state.

The messaging service 140 may comprise one or more push storage servers 234. The one or more push storage servers 234 may cache push requests and transmit the push requests to messaging clients. Push requests may be used to wake messaging clients, to notify messaging clients that a messaging update is available, and to otherwise perform server-side-driven interactions with messaging clients.

The messaging service 140 may comprise one or more group servers 235. The one or more group servers 235 may maintain lists of groups, add users to groups, remove users from groups, and perform the reception, caching, and forwarding of group chat messages.

The messaging service 140 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 140 may comprise one or more last seen information servers 237. The one or more last seen information servers 237 may receive, store, and maintain information indicating the last seen location, status, messaging client, and other elements of a user's last seen connection to the messaging service 140.

The messaging service 140 may comprise one or more key servers 238. The one or more key servers may host public keys for public/private key encrypted communication.

The messaging service 140 may comprise one or more profile photo servers 239. The one or more profile photo servers 239 may store and make available for retrieval profile photos for the plurality of users of the messaging service 140.

The messaging service 140 may comprise one or more spam logging servers 240. The one or more spam logging servers 240 may log known and suspected spam (e.g., unwanted messages, particularly those of a promotional nature). The one or more spam logging servers 240 may be operative to analyze messages to determine whether they are spam and to perform punitive measures, in some embodiments, against suspected spammers (users that send spam messages).

The messaging service 140 may comprise one or more statistics servers 241. The one or more statistics servers may compile and store statistics information related to the operation of the messaging service 140 and the behavior of the users of the messaging service 140.

The messaging service 140 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access messaging abuse prevention media display system 100.

The messaging service 140 may comprise one or more chat activity monitoring servers 243. The one or more chat activity monitoring servers 243 may monitor the chats of users to determine unauthorized or discouraged behavior by the users of the messaging service 140. The one or more chat activity monitoring servers 243 may work in cooperation with the spam logging servers 240 and block list servers 236, with the one or more chat activity monitoring servers 243 identifying spam or other discouraged behavior and providing spam information to the spam logging servers 240 and blocking information, where appropriate to the block list servers 236.

The messaging service 140 may comprise one or more sync servers 244. The one or more sync servers 244 may sync the messaging system 240 with contact information from a messaging client, such as an address book on a mobile phone, to determine contacts for a user in the messaging service 140.

The messaging service 140 may comprise one or more multimedia servers 245. The one or more multimedia servers may store multimedia (e.g., images, video, audio) in transit between messaging clients, multimedia cached for offline endpoints, and may perform transcoding of multimedia.

The messaging service 140 may comprise one or more payment servers 246. The one or more payment servers 246 may process payments from users. The one or more payment servers 246 may connect to external third-party servers for the performance of payments.

The messaging service 140 may comprise one or more registration servers 247. The one or more registration servers 247 may register new users of the messaging service 140.

The messaging service 140 may comprise one or more voice relay servers 248. The one or more voice relay servers 248 may relay voice-over-internet-protocol (VoIP) voice communication between messaging clients for the performance of VoIP calls.

Figure 3:
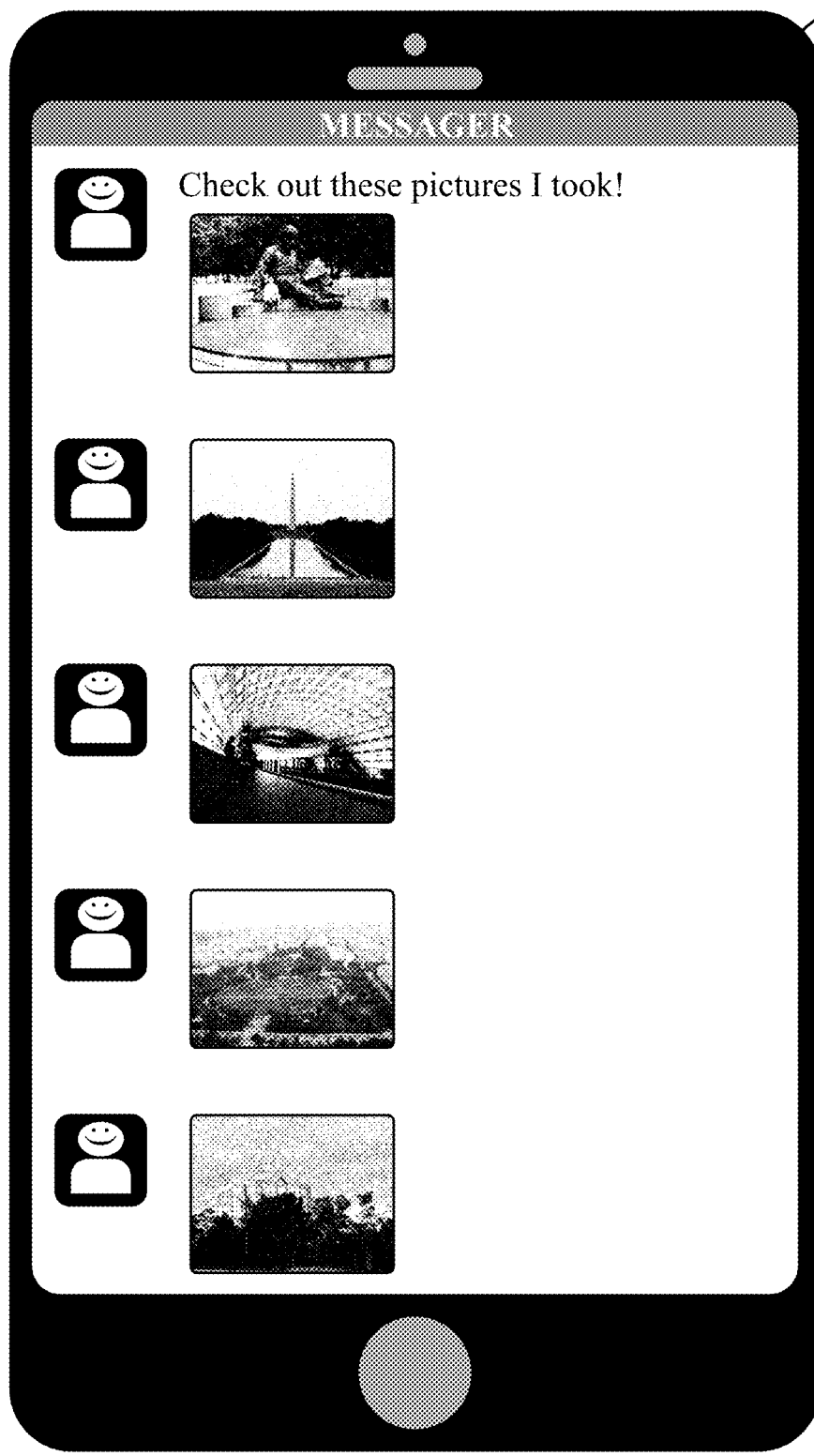
FIG. 3 illustrates an embodiment of a messaging client receiving sequential messages of visual media items.

FIG. 3 illustrates an embodiment of a messaging client receiving sequential messages of visual media items 130.

User interface 300 may correspond to a naive display of a series of media items 130 received as part of sequential messages 310. Each of the messages 310 may correspond to each of the receiver messaging packages 110. Each of the messages 310 may comprise a particular media item of the plurality of media items 130.

The user interface 300 may display each of the media items 130 as its own message received from the sending user of the sending client device 125. In the illustrated embodiment of FIG. 3, the user interface 300 includes a user avatar for each of the received messages 310. However, in other embodiments the user avatar for the sending user may be only displayed once for each sequential message that isn't interrupted by a message sent by the receiving user or another user (such as in a group conversation).

As can be seen in user interface 300, the display of just five media items is sufficient to fill the display of the receiving client device 120. While various sequential, individual layouts for messages and media items may allow for a different number of media items to be displayed in sequence on the display of a client device. However, it will be appreciated that, in general, the other user interface embodiments described herein may provide for a reduced use of screen real estate in displaying the media items 130 and therefore allow for a more convenient integration of visual media items into the flow of a conversation, showing more of the history of a conversation rather than that history being moved off the visible display to accommodate the media items 130. For example, if the participants in the illustrated messaging conversations had exchanged other messages—media items and/or text exchanges—prior to message 310-1 those prior messages would have been scrolled off the screen of the receiving client device 120. Group layouts may eliminate this user interface inefficiency.

Figure 4A:
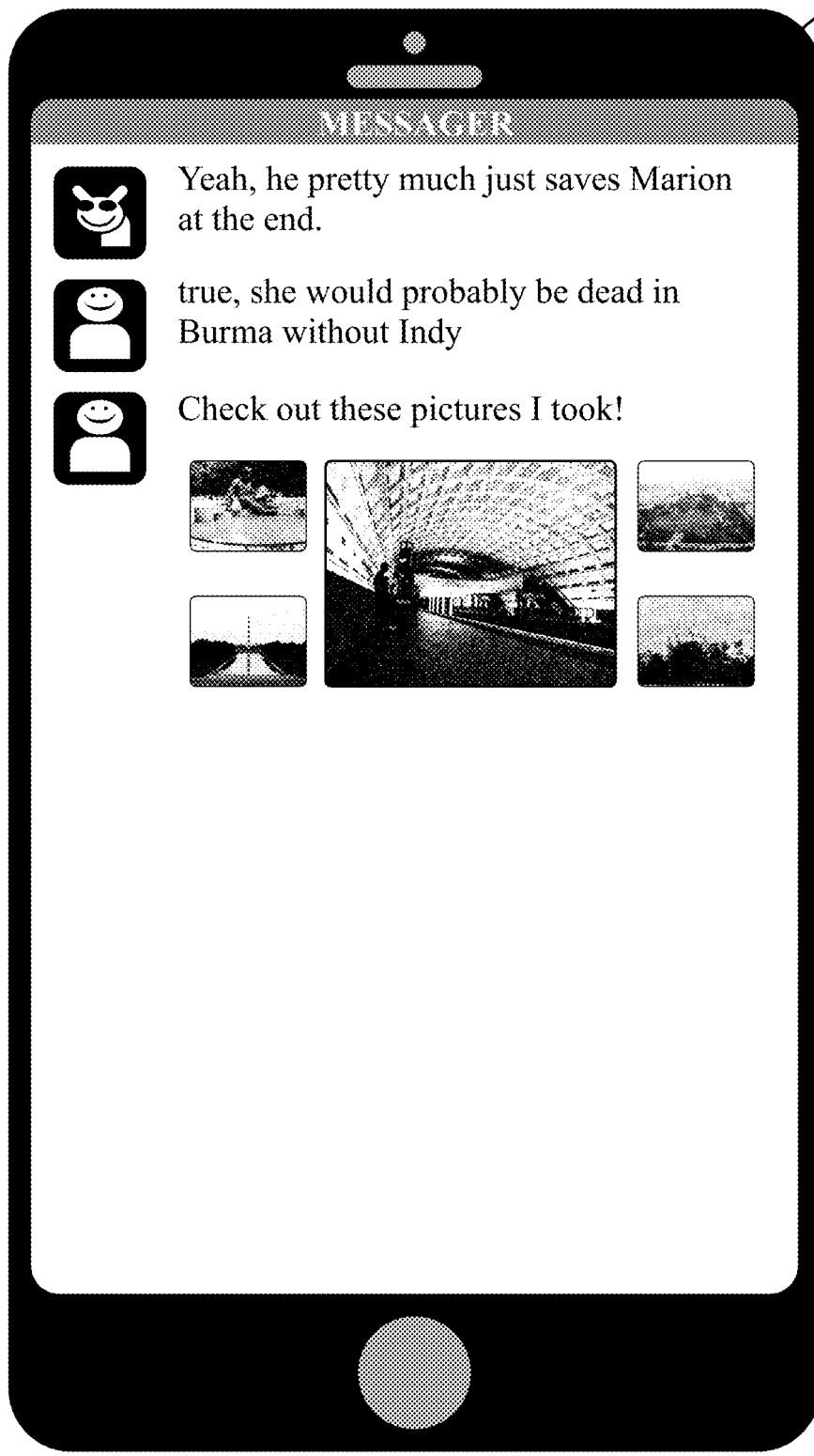
FIG. 4A illustrates an embodiment of a group layout of visual media items.

FIG. 4A illustrates an embodiment of a group layout 410 of visual media items 130.

In user interface 400 the sequence of media items 130 has been recognized after being received via the receiver messaging packages 130. A particular user may have sent a continuous (i.e., non-interrupted) sequence of messages 310 comprising the media elements 130 to the user of the messaging client on the receiving client device 120. The messaging client may recognize the continuous sequence of messages 310 and automatically group the media items 130 from the messages 310 into a group using a group layout 410.

The group layout 410 may comprise a definition of a size and position of each of the media items 130 that arranges the media items 130 into a group that can be jointly manipulated. In the illustrated embodiment of FIG. 4A the group layout 410 uses different sizes for different media items to highlight one of the media items while still making all of the media items visible. A media item may be selected for promotion in a larger, more prominent spot in a group layout 410 based on various manual and automatic techniques. In some embodiments, a user may specify an importance or priority for media items or may select a particular media item to use as the most prominent media item. In some embodiments, automatic techniques may be used, such as selecting for promotion a media item identified as containing people instead of scenery. In other cases, a group layout may simply comprise a grid of equally-sized media items.

In some cases, the messaging client may limit itself to grouping a limited or maximum number of media items (e.g., no more than ten items may be grouped together). In some cases, the messaging client may only select for grouping media items that are received within a span of time shorter than a predefined threshold (i.e., based on the total span of time between the first-received and last-received media item included in the group), that are received within an immediacy of each other (i.e., based on each of the spans of time between each of the media items included in the group), or according to any other technique for grouping media items for which temporal proximity is a factor.

As can be seen in the illustrated example of FIG. 4A, the use of a group layout 410 has reduced the amount of space used for the display of the media items 130. This may allow all the media items 130 to remain visible on screen for longer as the conversation progress beyond the sharing of the media items 130. Similarly, this may allow any messaging history for the messaging conversation prior to the sharing of the media items 130 to remain on-screen longer rather than being scrolled off-screen by the sharing of the media items 130. This reduction in the use of screen space to display the media items 130 may therefore generally allow the display screen of the receiving client device 120 to show more of a messaging conversation and thereby improve the usage of the display screen. Further, as each user manipulation of a display screen may cause the recalculation of what display elements are visible and what are not, and their position on the screen, this may reduce the user's need to scroll the screen and therefore reduce the amount of computational resource (and therefore power) used in incorporating media items 130 into a messaging conversation.

Figure 4B:
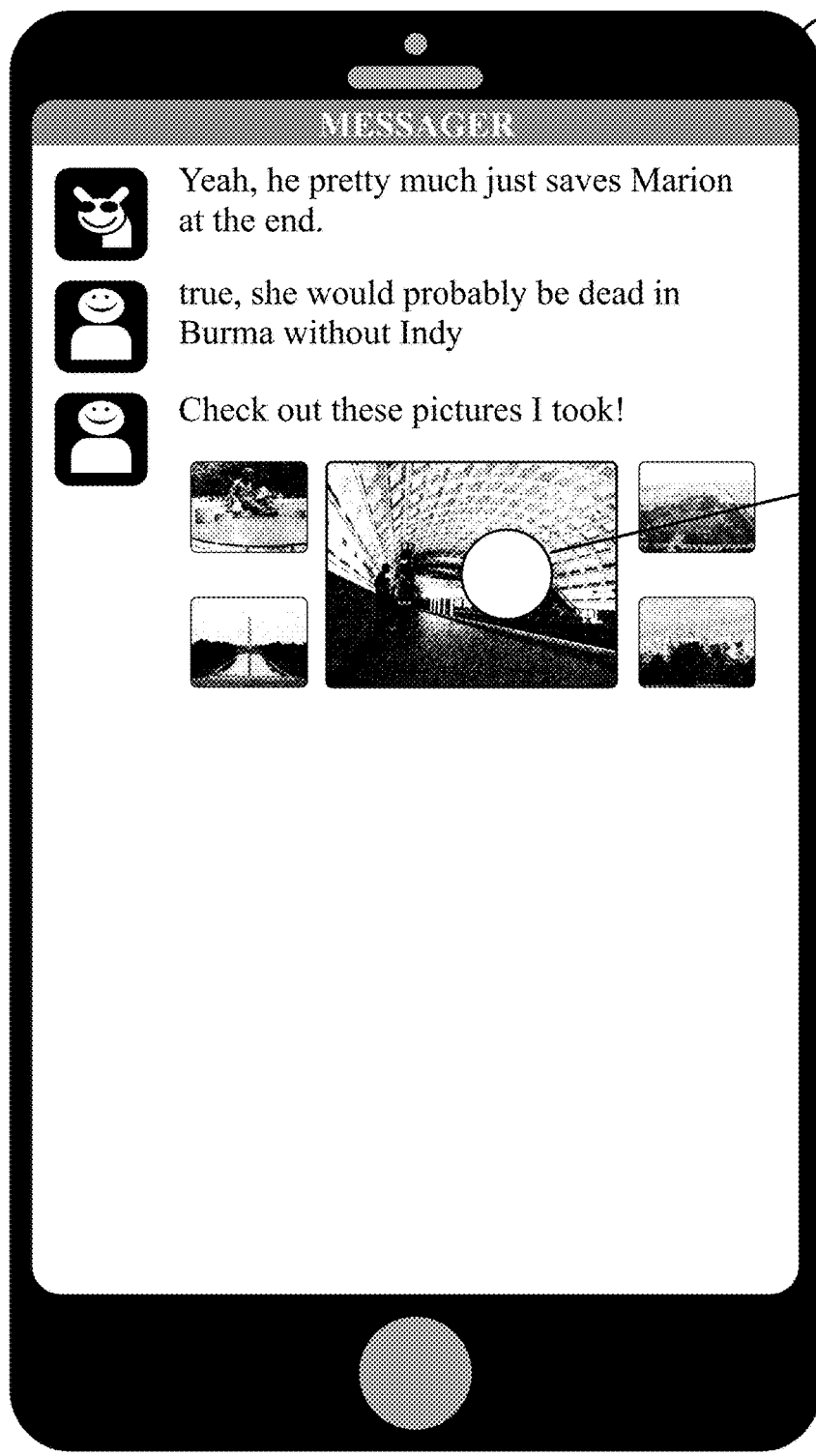
FIG. 4B illustrates an embodiment of group selection of a group layout of visual media items.

FIG. 4B illustrates an embodiment of group selection of a group layout 410 of visual media items 130 in a user interface 425.

The user of the receiving client device 120 may engage in haptic contact with a touchscreen of the receiving client device 120. The haptic contact may correspond to the user of the receiving client device 120 pressing and holding anywhere on the touchscreen associated with the media elements 130. It will be appreciated that in other device environments other selection methods may be used, such as may include the use of a stylus, keyboard or other buttons, and/or pointer device. The user's user interface action may generally correspond to selecting the group layout 410 according to a predefined user interface scheme so as to activate group controls for a particular group layout 410.

Figure 4C:
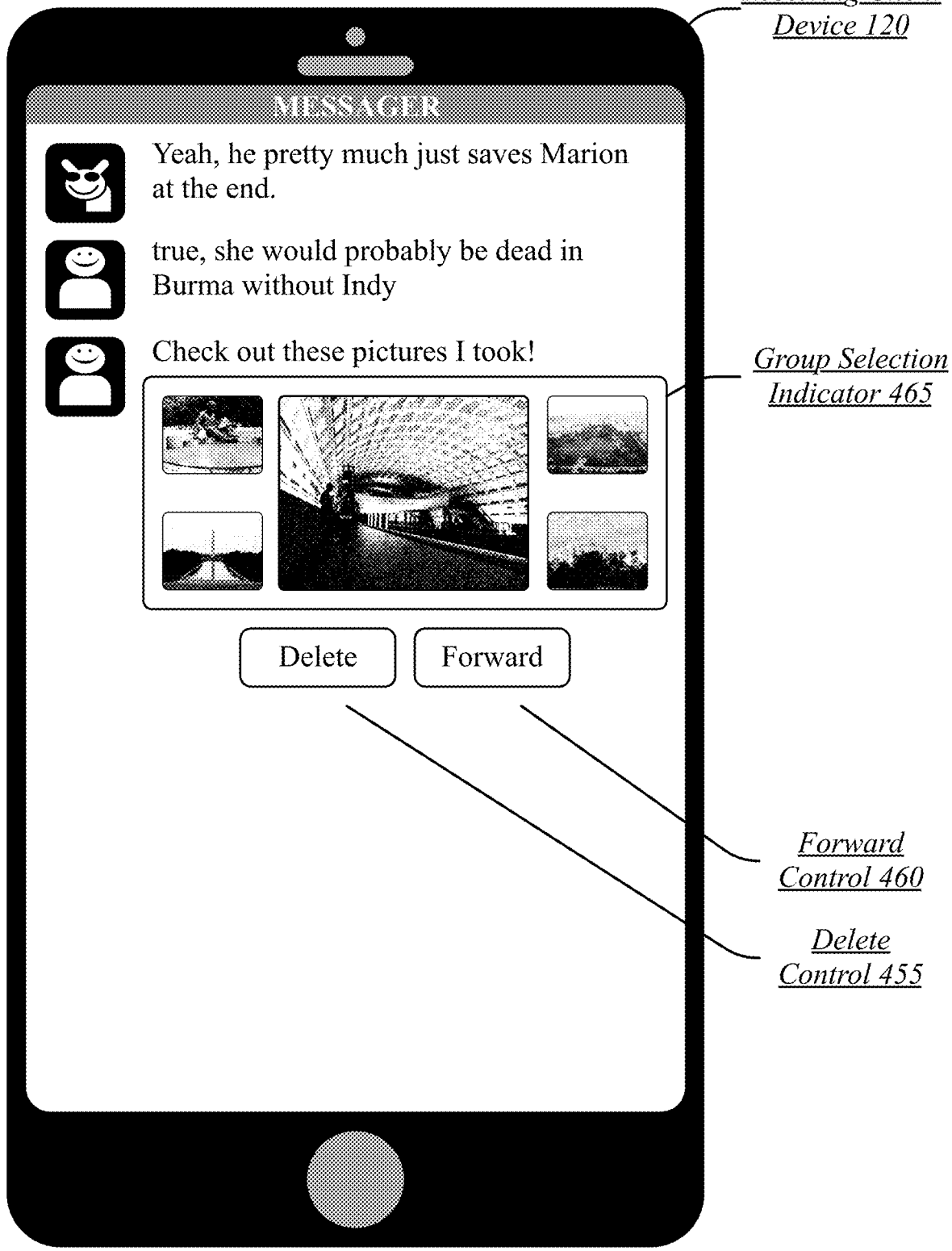
FIG. 4C illustrates an embodiment of group controls of a group layout of visual media items.

FIG. 4C illustrates an embodiment of group controls of a group layout 410 of visual media items 130 in a user interface 450.

The group controls may be displayed in response to a user engaging with the display of the group layout 410 through haptic contact or other user interface engagement. The group controls may comprise a delete control 455. The delete control 455 may empower the user of the messaging client to delete the entire group of media items 130. The group controls may comprise a forward control 460. The forward control 460 may empower the user of the messaging client to forward the entire group of media items 130. As such, a user selection may be received of a group control displayed in reference to the plurality of media items 130 and the group control may be acted on with reference to the entire group.

The selection of a group may be indicated with a group selection indicator 465 visually indicating the group of media items 130 to which a group control will be applied. In some embodiments, the user of the messaging client may be empowered to modify the selected group and which media items are included in the group. The user of the messaging client may be empowered to select a single media item to which the controls will be applied.

Figure 4D:
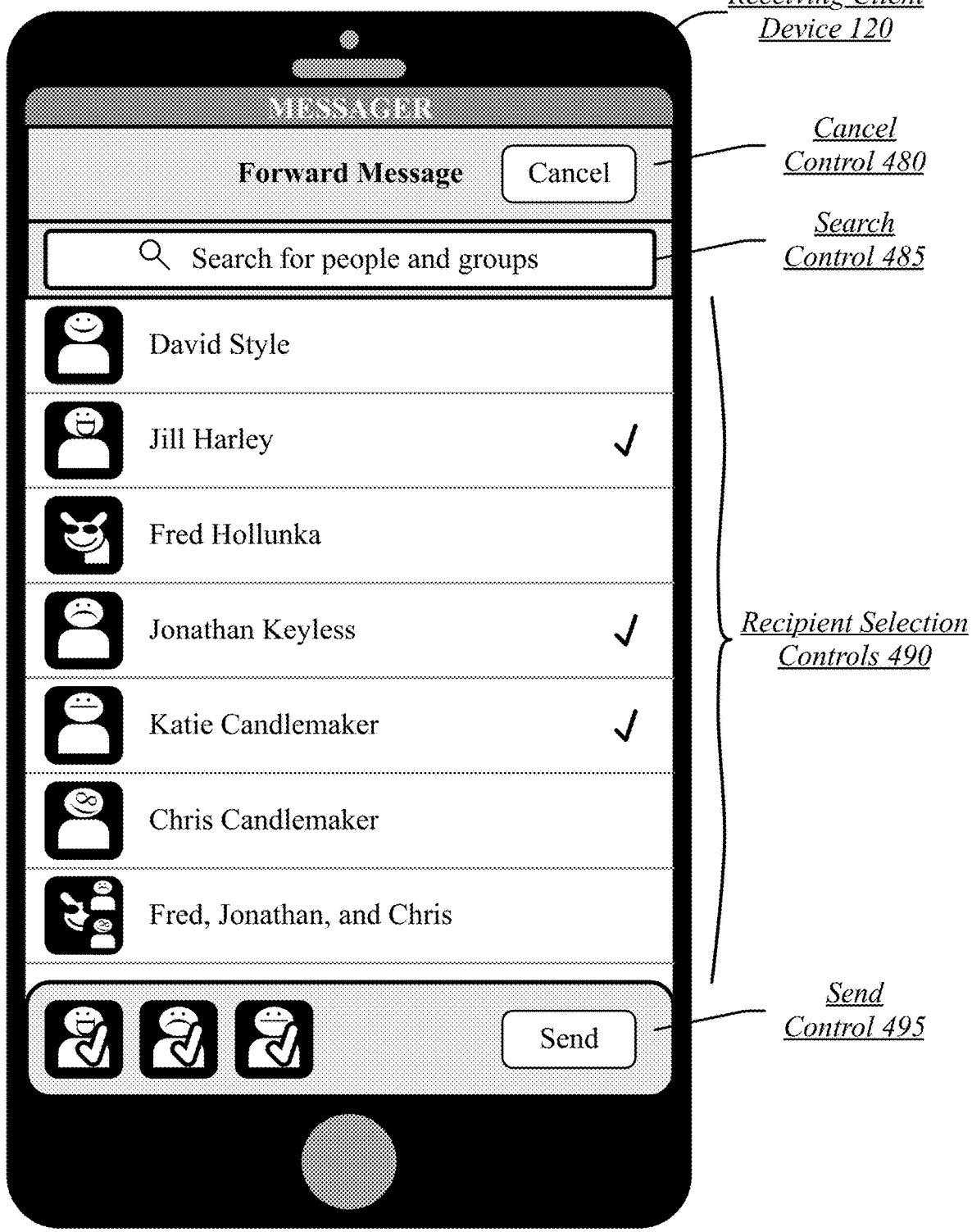
FIG. 4D illustrates an embodiment of recipient selection controls for forwarding a group of visual media items.

FIG. 4D illustrates an embodiment of recipient selection controls for forwarding a group of visual media items 130 in a user interface 475.

The user interface 475 may comprise a forwarding configuration interface for configuring the forwarding of media items 130. The forwarding configuration interface may be reached by a user of the messaging client selecting a forward control 460 in reference to a group of media items 130.

The forwarding configuration interface may include a cancel control 480. The cancel control 480 may empower a user to cancel the forwarding of the group of media items 130.

The forwarding configuration interface may include a send control 495. The send control 495 may empower a user to transmit the group of media items 130 to a select one or more users of the messaging service 140 and/or to group conversations carried out via the messaging service 140.

The forwarding configuration interface may include recipient selection controls 490. The recipient selection controls 490 may empower the user to select one or more users and/or one or more group conversations to receive the group of media items 130. Each of a user's previously-messaged users, existing individual messaging conversations, existing group messaging conversations, and/or address book/contact list entries may be available in the recipient selection controls 490. Multiple users and/or groups may be selected to receive the media items 130. A selection icon—in the illustrated embodiment of FIG. 4D a check mark—may be displayed next to each selected recipient. Where more potential recipients exist than can be displayed on a single screen the recipient selection controls area may be scrolled. The avatars, combined avatars, or other icon representing the selected recipients may be displayed along the bottom of the forwarding configuration interface in association with the send control 495.

Figure 5A:
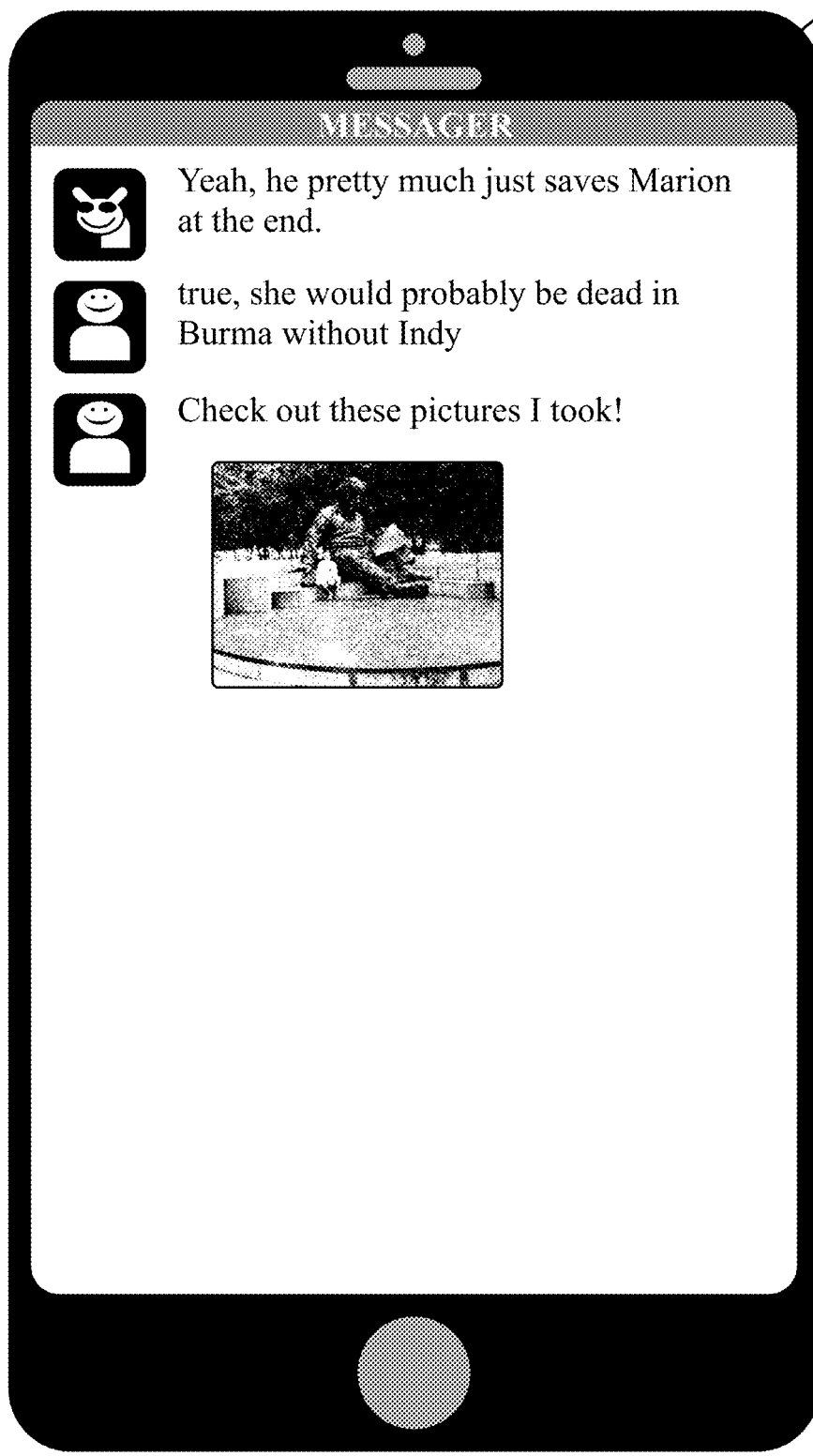
FIG. 5A illustrates an embodiment of a unitary layout of a group of visual media items.

FIG. 5A illustrates an embodiment of a unitary layout 510 of a group of visual media items 130 in a user interface 500. A unitary layout 510 may collect together a group of media items 130 into a combined layout in which, except during transitions, only a single media items of the group of media items 130 is visible at one time. The particular media item initially visible may be a first-received media item, may be a last-received media item, or may be a media item selected for prominence according to a variety of criteria, such as promoting media items that show people, that are categorized as important to the sender, that are predicted to be of interest to the receiver, or according to any other technique.

Figure 5B:
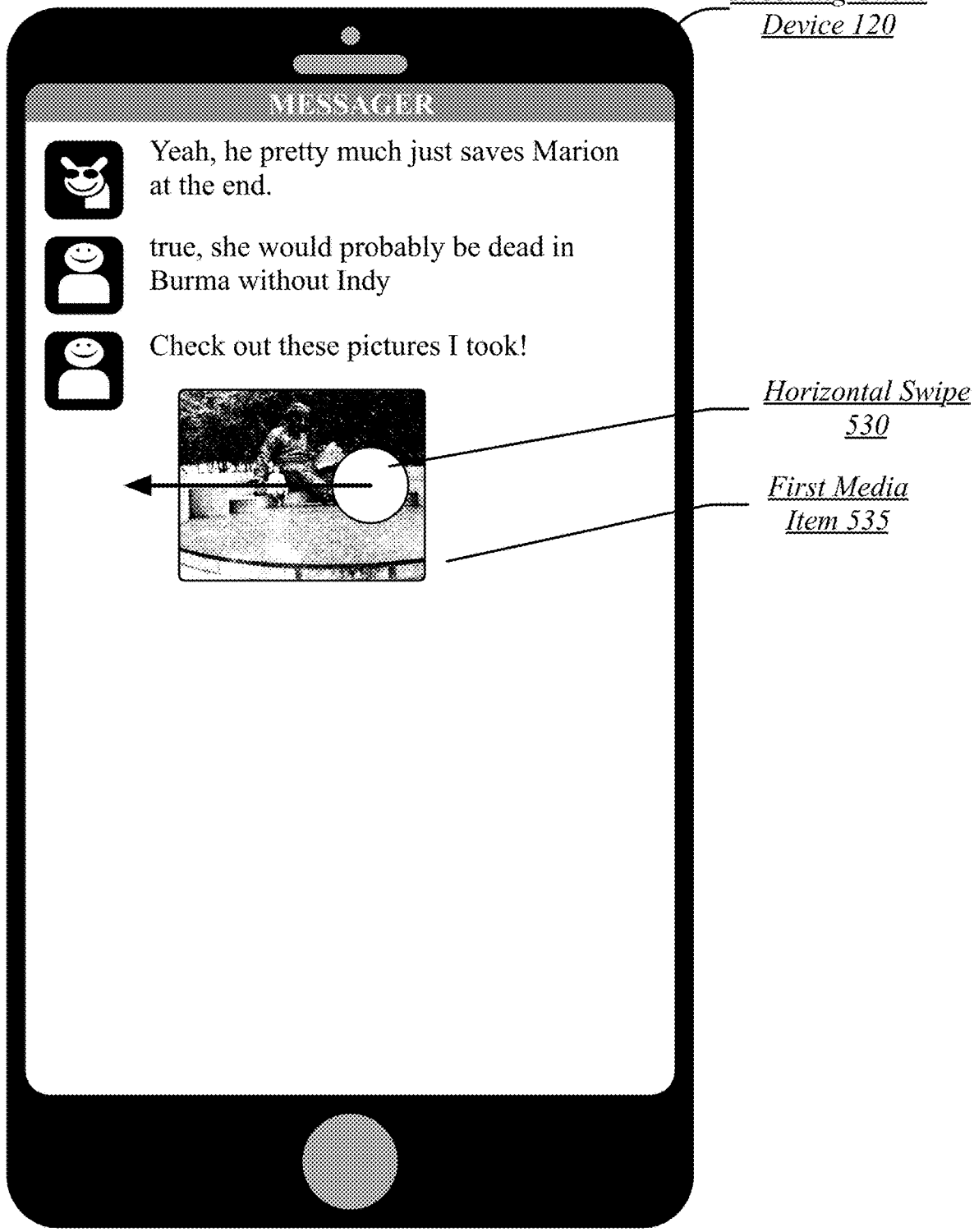
FIG. 5B illustrates an embodiment of an initiation of a horizontal swipe on the unitary layout of a group of visual media items.

FIG. 5B illustrates an embodiment of an initiation of a horizontal swipe 530 on the unitary layout 510 of a group of visual media items 130 in a user interface 525.

The horizontal swipe 530 may comprise a haptic engagement with a touchscreen of the receiving client device 120 that transitions in a horizontal direction over at least some portion of the unitary layout 510. In the illustrated embodiment of FIG. 5B, the horizontal swipe 530 has just begun with the initial haptic engagement without the horizontal motion having yet begun. In this case, a first media item 535 of the group of media items 130 is being displayed in the user interface 525. However, similar techniques may be applied for the transition between any of the media items 130 in sequence.

Figure 5C:
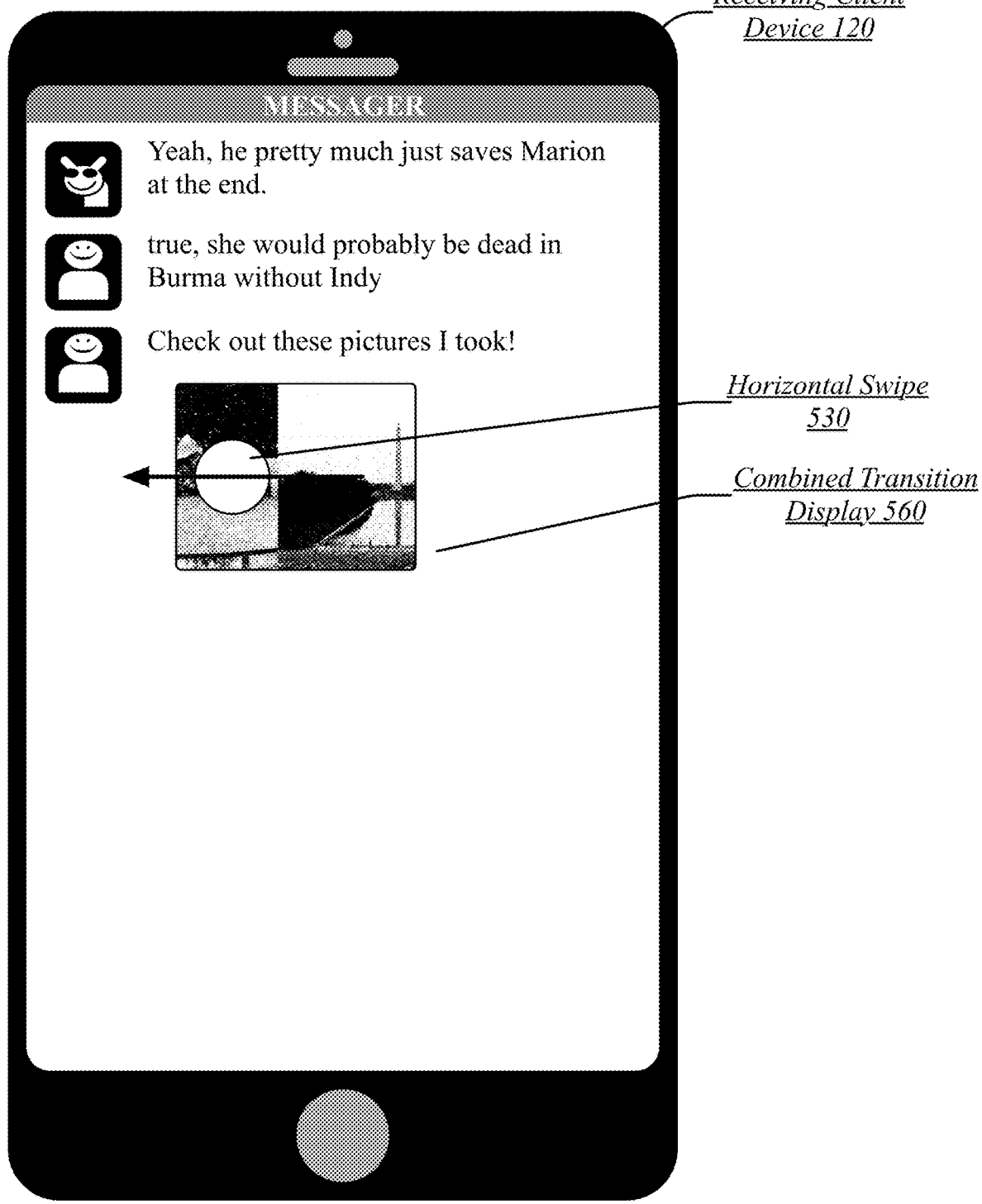
FIG. 5C illustrates an embodiment of a transition between visual media items during a horizontal swipe on the unitary layout of a group of visual media items.

FIG. 5C illustrates an embodiment of a transition between visual media items 130 during a horizontal swipe 530 on the unitary layout 510 of a group of visual media items 130 in a user interface 550.

In the illustrated embodiment of FIG. 5C, the horizontal swipe 530 has progressed partway across the display of the unitary layout 510 of the group of media items 130. In response, the messaging client may display a combined transition display 560 animating the transition between two media items. The combined transition display 560 may contain a portion of the media item being transitioned from and a portion of the media item being transitioned to. The media item being transitioned from may be slid out of view while the media item being transitioned to is sled into view. The total screen area used to display the unitary layout 510 may remain constant during the transition, such that the media item being transitioned from is eclipsed from view as it transitions away and that the media item being transitioned to incrementally becoming visible as it transitions into view.

Figure 5D:
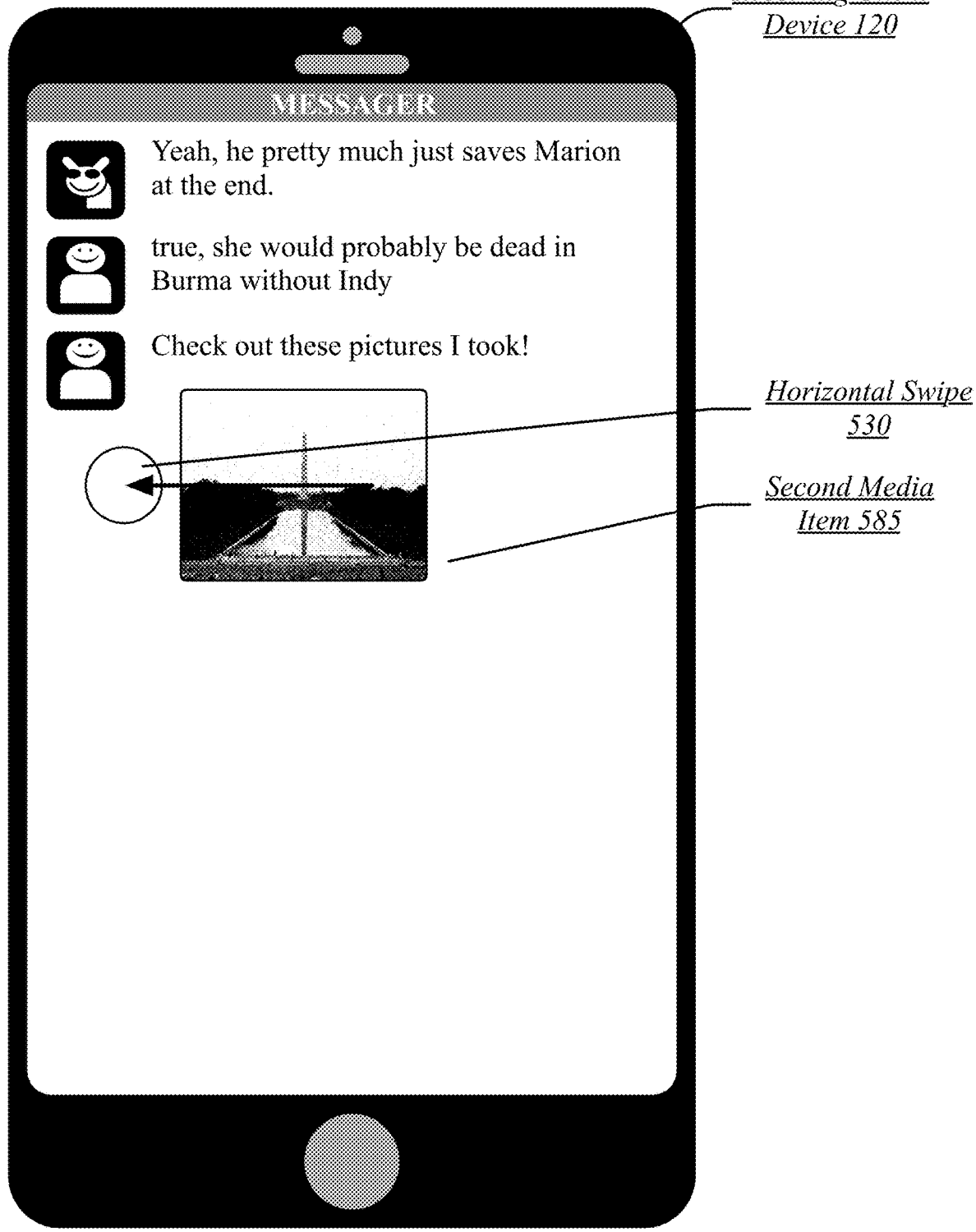
FIG. 5D illustrates an embodiment of a completed transition to a second media item from a horizontal swipe on the unitary layout of a group of visual media items.

FIG. 5D illustrates an embodiment of a completed transition to a second media item 585 from a horizontal swipe on the unitary layout 510 of a group of visual media items 130 in a user interface 575.

In the illustrated embodiment of FIG. 5C, the horizontal swipe 530 has progressed to its completion. In response to the completion of the horizontal swipe 530, the transition to the second media item 585 has been completed. The completion of the horizontal swipe 530 may be measured relative to the display location and/or display size devoted to the unitary layout 510. A completed horizontal swipe 530 may comprise one that has reached the side of the unitary layout 510 in the direction of the progress of the horizontal swipe 530. A completed horizontal swipe 530 may comprise one that has reached the horizontal length of the screen area devoted to the unitary layout 510. Various techniques may be used for determining when a horizontal swipe 530 is complete.

Additional horizontal swipes may be used to transition to further media items. Horizontal swipes in the opposite direction may transition through the media items 130 in the reverse order. In general, this may empower the messaging client to display a group of media items 130 one-at-a-time in-line with a messaging conversation without transitioning to an image-specific user interface display.

Figure 6A:
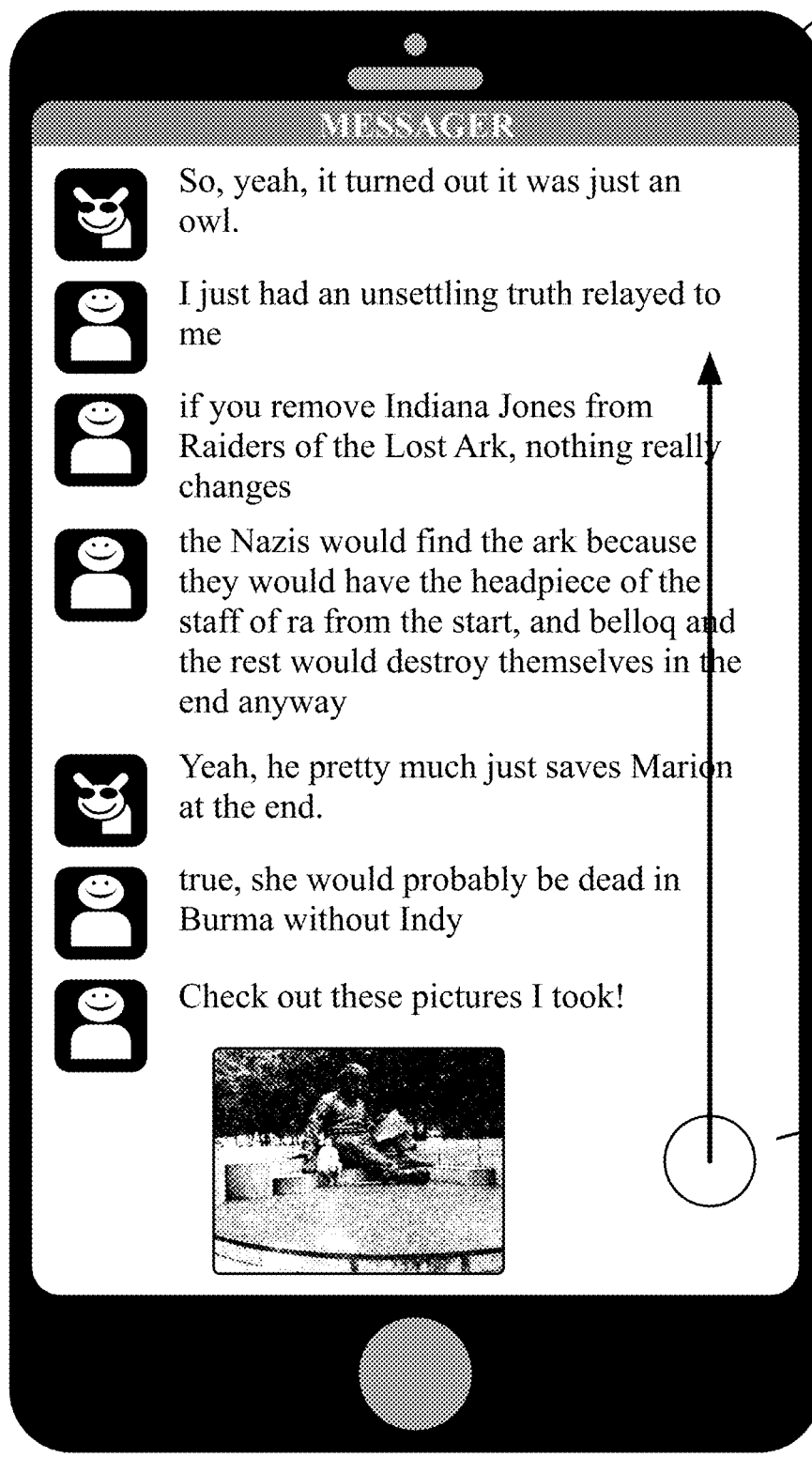
FIG. 6A illustrates an embodiment of a scroll of a messaging conversation showing a unitary layout of a group of visual media items.

FIG. 6A illustrates an embodiment of a scroll 605 of a messaging conversation showing a unitary layout 510 of a group of visual media items 130 in a user interface 600.

In illustrated embodiment of FIG. 6A the user may be partway through a messaging history for the messaging conversation, with the unitary layout 510 of the media items 130 at the bottom of the user interface 600 for a messaging client. The user of the receiving client device 120 may have engaged in haptic contact with the bottom of the display area of the messaging conversation to begin the scroll 605. In the illustrated embodiment of FIG. 6A, the scroll 605 has just begun with the initial haptic engagement without the motion of the point of haptic contact having yet begun.

Figure 6B:
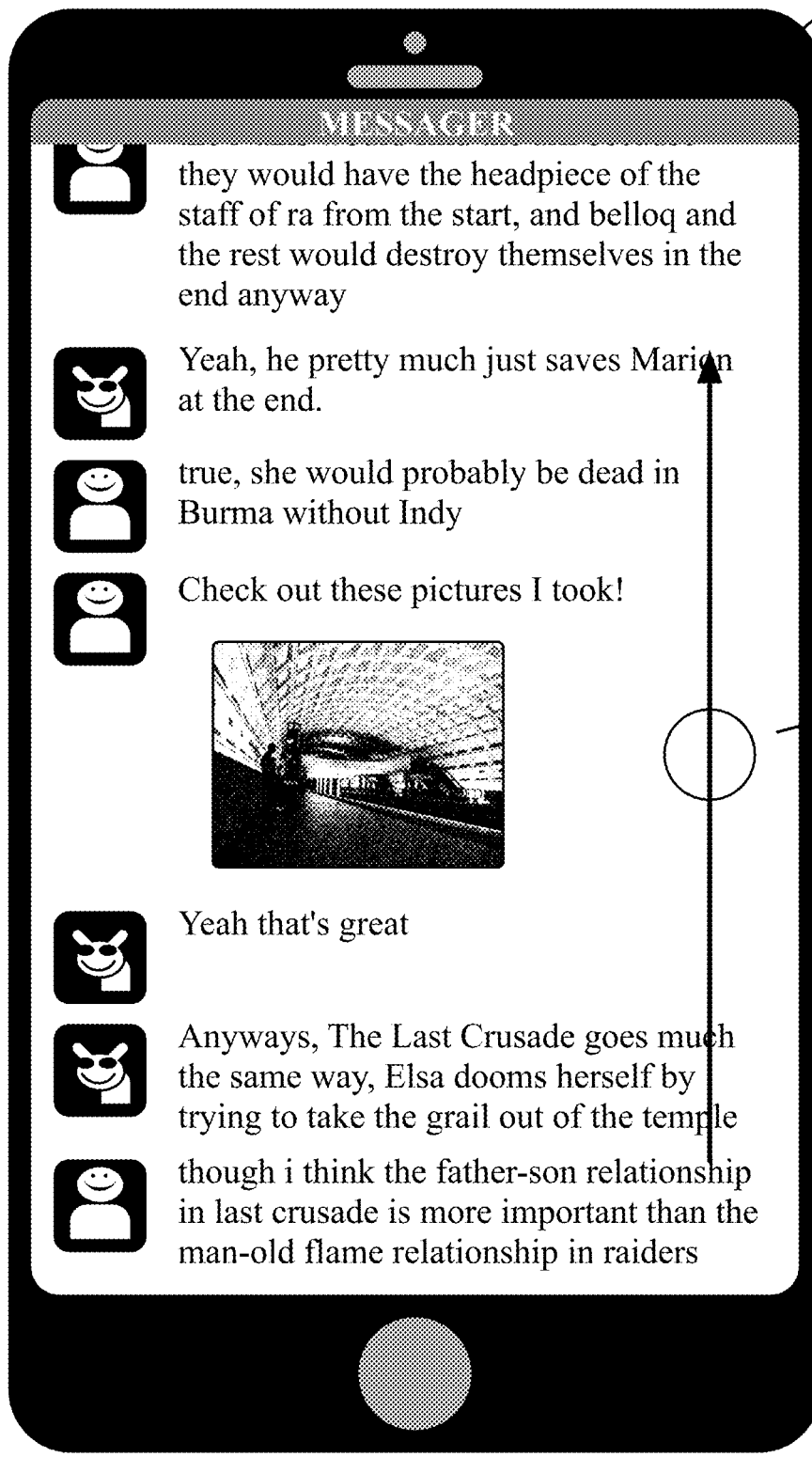
FIG. 6B illustrates an embodiment of a transitioned unitary layout during a scroll of a messaging conversation showing a unitary layout of a group of visual media items.

FIG. 6B illustrates an embodiment of a transitioned unitary layout 510 during a scroll 605 of a messaging conversation showing a unitary layout 510 of a group of visual media items 130 in a user interface 625.

The transitioned unitary layout 510 has moved to a next media item in sequence in the group of media items 130. The scroll 605 may have reached a middle point in the screen area of the messaging client and therefore transitioned to a middle media item of the group of media items 130. During the scroll 605 the unitary layout 605 may transition between each of the media items 130 in turn.

Figure 6C:
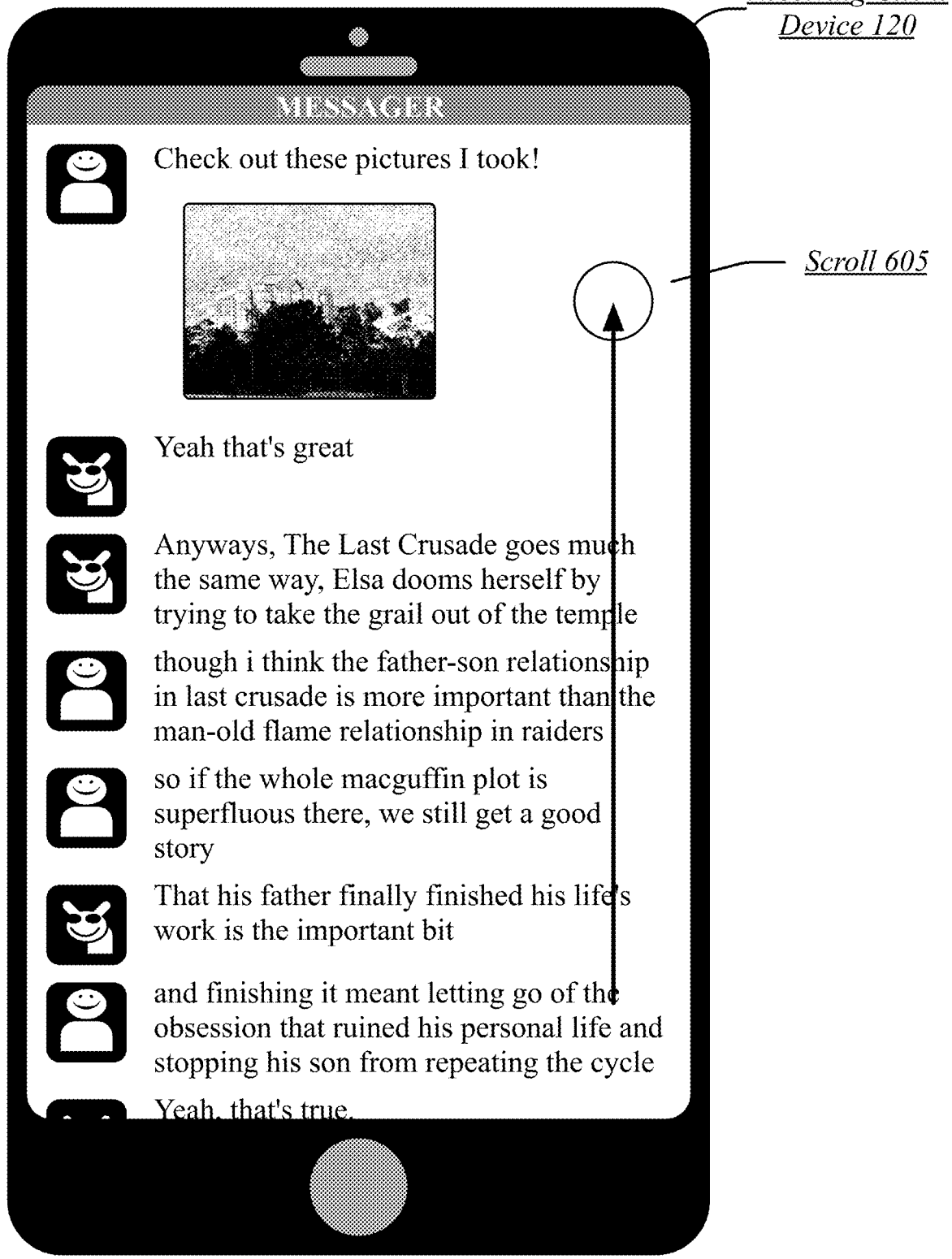
FIG. 6C illustrates an embodiment of a fully-transitioned unitary layout during a scroll of a messaging conversation showing a unitary layout of a group of visual media items.

FIG. 6C illustrates an embodiment of a fully-transitioned unitary layout 510 during a scroll 605 of a messaging conversation showing a unitary layout 510 of a group of visual media items 130 in a user interface 650.

The fully-transitioned unitary layout 510 has moved to a final media item in sequence in the group of media items 130. The transition to the final media item is in response to the display of the unitary layout 510 reaching the top of the display area for the messaging client. As such, all of the media items in the group of media items 130 has been displayed for the user of the receiving client device 120.

While the illustrated example of FIGS. 6A, 6B, and 6C depict the transition through the unitary layout based on a user scrolling through the existing messaging history of a messaging conversation, in other cases the transition through the unitary layout may be performed in response to the scrolling performed automatically by the messaging client due to the progress of a messaging conversation. Rather than FIG. 6C being reached as a result of an explicit user scroll 605, the transition from the embodiment of FIG. 6A through the embodiment of FIG. 6B to the embodiment of FIG. 6C may result from messages being received in the messaging conversation and being iteratively added to the display of the messaging conversation. The addition of a new message to a messaging conversation may cause the display of the messaging conversation to scroll to accommodate the new message at the bottom of the display. This may move all of the previous entries in the messaging conversation—including the unitary layout 510 of the media elements 310—upwards on the screen. This may invoke the transition of the unitary layout 510 between its component media items through this automatic scrolling based on the same process as the transition of the unitary layout 510 between its component media items through an explicit user scroll 605.

The automatic transition of unitary layout 510 may serve to promote the media items 130 shared between users while having the display of the media items 130 use little interface space. A user's attention may be attracted to moving, changing, or otherwise dynamic elements of a user interface. By automatically cycling the media items 130 the media items 130 may be presented in a dynamic manner that draws the receiving user's attention to each new media item as it transitions into view. Further, as compared to a receiving user glossing over a large group of media items 130, a user may be shown only one full media item at a time (with two potentially being visible during an animated transition between two media items). This may serve to draw a user's attention to each of the media items 130 in turn. These effects may therefore increase the likelihood of a receiving user noticing and considering all or some of the media items 130, thereby increasing the utility of sharing media items via the messaging service 140. Further, this transition may be particularly appealing where the images form a sequence, such as having been taken closely together in time, communicating the progress of a process, or otherwise forming a crude animation.

A delay may be set between the transitioning of media items in the unitary layout 510 when prompted by a user-controlled or automatic scroll 605. The scrolling of the messaging conversation may alternate between states in which a particular media item is displayed and states in which the display of the media items transitions from one media item to the next. A particular percentage of the scrolling space available for the display of the group of media items 130 may be predefined as assigned to the former states and a particular percentage assigned to the latter states. Various techniques may be used for determining for how long and far non-transitioning media items are shown and for how long and far transitions between media items are displayed. Alternatively, in some embodiments, transition displays between media items may not be used with an immediate, non-animated replacement of each media item in sequence being used.

Figure 7:
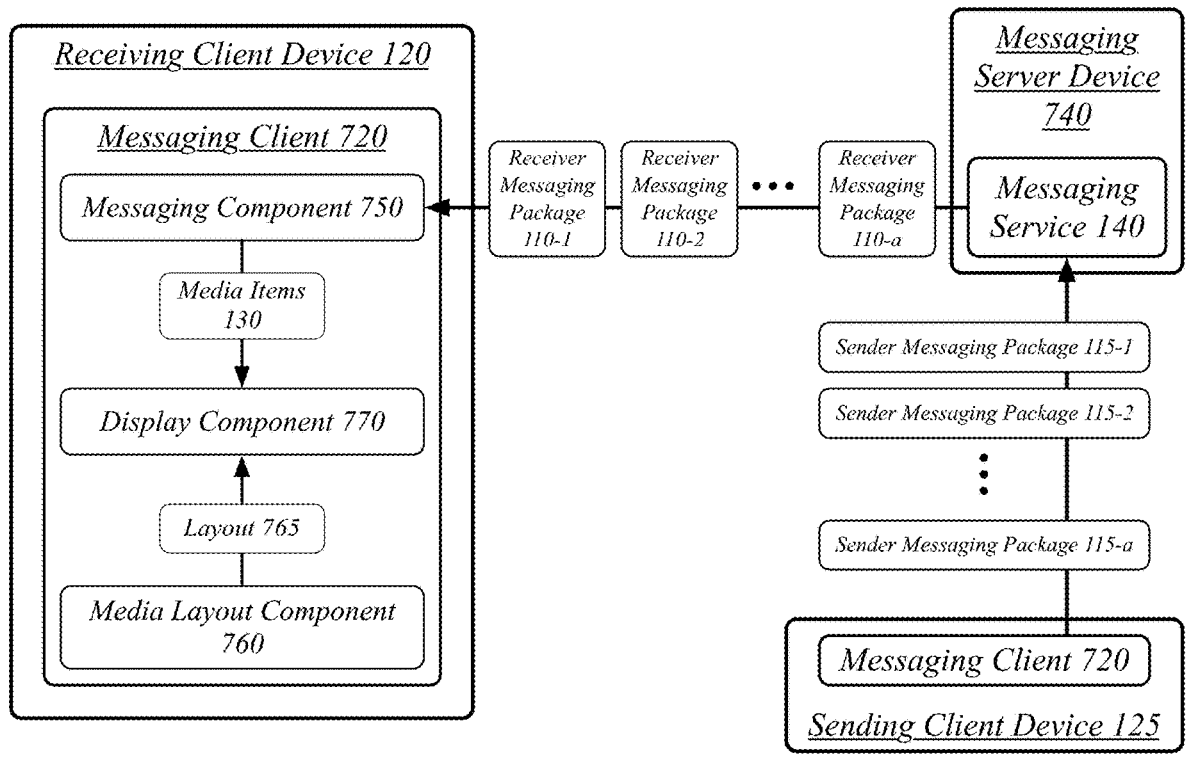
FIG. 7 illustrates an embodiment of a messaging client selecting a layout for a received sequence of visual media items.

FIG. 7 illustrates an embodiment of a messaging client 720 selecting a layout 765 for a received sequence of visual media items 130. Each of the receiving client device 120 and sending client device 125 may execute an instance of the messaging client 720.

The messaging service 140 may be implemented by a messaging server device 740. The messaging server device 740 may comprise one of a plurality of a messaging server devices used to execute the messaging service 140. The messaging server device may correspond to a device providing a chat server of the chat servers 215 described with reference to FIG. 2.

A messaging component 750 may be generally arranged to receive a plurality of receiver messaging packages 110 from a messaging server device 740 and determine a plurality of visual media items 130 referenced by the plurality of receiver messaging packages 110. In some embodiments, the media items 130 may be included in receiver messaging packages received from the messaging server device 740. In other embodiments, the media items 130 may be included by reference. The messaging component 750 may request the plurality of visual media items 130 from a media messaging server and receive the plurality of visual media items 130 from the media messaging server via a network connection to the media messaging server. The media messaging server may execute on the same messaging server device 740 or on a different server device in various embodiments.

The messaging component 750 may define the plurality of visual media items 130 as a group for inclusion in the visual media item layout 765 in response to the plurality of visual media items 130 being received in uninterrupted sequence from a same transmitting user account. The transmitting user account may identify the user of the sending client device 125 within the messaging service 140.

A media layout component 760 may be generally arranged to determine a visual media item layout 765. The plurality of visual media items 130 may correspond to a media item quantity counting the number of visual media items 130. The visual media item layout 765 may be selected from a plurality of predefined media item layouts based on the media item quantity. The media layout component 760 may maintain a repository of visual media item layouts with each visual media item layout associated with a particular media item quantity. The media layout component 760 may determine the one or more visual media item layouts associated with the media item quantity for the plurality of visual media items 130 and select one as the determined visual media item layout 765. Where multiple visual media item layouts correspond to a same media item quantity additional criteria may be used to select a particular visual media item layout. For instance, a visual media item layout may be selected because it is assigned for use with a particular visual media item type, such as a still image type, video type, animated image type, or mixed-media type.

In some cases, a visual media item layout 765 may be specified in one or more of the receiver messaging packages 110. The layout 765 of the media items 130 may be specified in terms of their position and size for display. As such, at least one receiver messaging package of the received plurality of receiver messaging packages 110 may comprise a visual media item layout definition defining the visual media item layout 765. Alternatively, a predefined layout 765 from a plurality of existing layouts may be specified, the layout 765 already stored on the receiving client device 120.

In some embodiments, panoramic-specific layouts may be used for media items that form a panorama when viewed in a particular orientation. Two or more of the media items 130 may be flagged as corresponding to a panorama in the receiver messaging packages 110. Alternatively, the media layout component 760 may automatically identify that a panorama may be formed. In response, a visual media item layout 765 may be selected that defined a panoramic combination of the plurality of visual media items 130.

A display component 770 may be generally arranged to display the plurality of visual media items 130 based on the visual media item layout 765.

Figure 8:
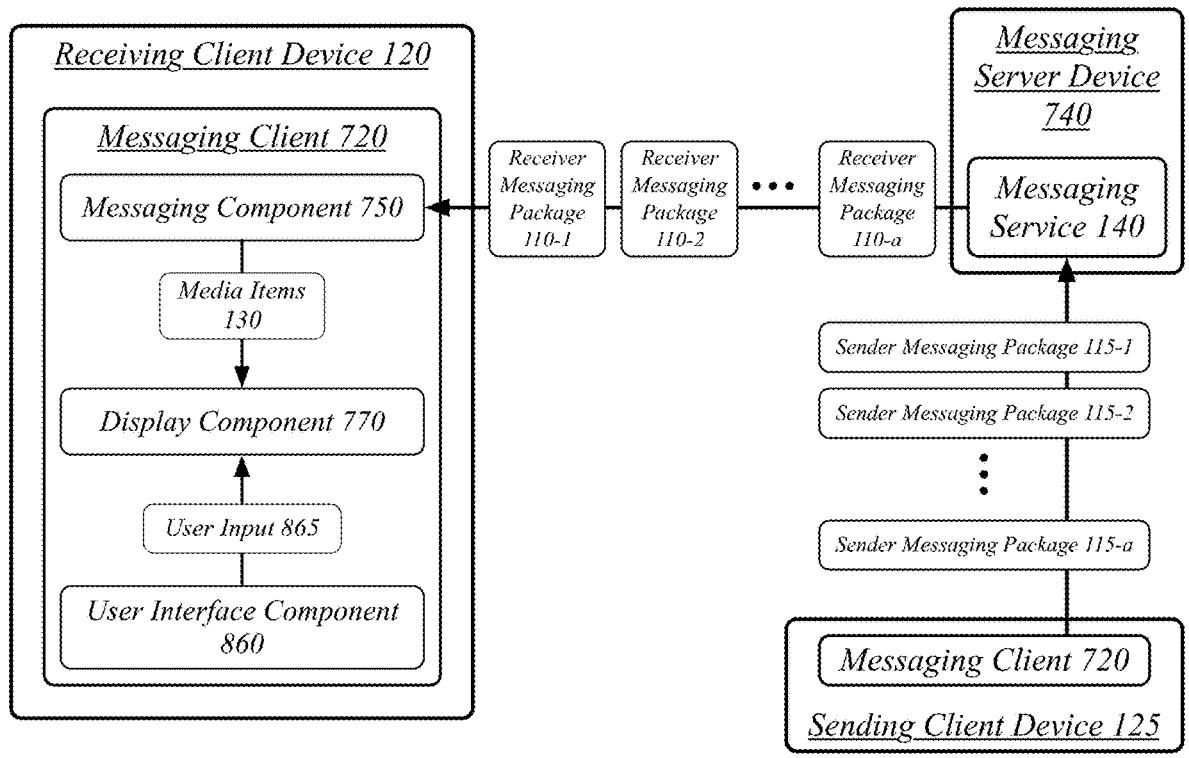
FIG. 8 illustrates an embodiment of a messaging client receiving user input in relation to a displayed group of visual media items.

FIG. 8 illustrates an embodiment of a messaging client 720 receiving user input 865 in relation to a displayed group of visual media items 130.

The display component 770 may display a messaging thread user interface. The display component 770 may display a first visual media item of the plurality of visual media items 130 in the messaging thread user interface. A user interface component 860 may recognize user input 865 corresponding to a horizontal swipe across the first visual media item. The display component 770 may receive the user input 865 comprising the horizontal swipe of the first visual media item and replace the first visual media item in the messaging thread user interface in response to the horizontal swipe. The display component 770 may replace the first visual media item with a second visual media item of the plurality of visual media items 130 in response to the horizontal swipe.

The display component 770 may display a first visual media item of the plurality of visual media items 130 in a user interface. The user interface component 860 may receive a user scroll of the user interface. The display component 770 may replace the first visual media item in the user interface in response to the user scroll. The user interface may comprise a messaging thread user interface. Alternatively, the user interface may comprise an album user interface displaying a particular media album. The user interface may comprise a multi-album user interface displaying a plurality of media albums. Where the second visual media item is available on the receiving client device 120, the display component 770 may replace the first visual media item with a second visual media item of the plurality of visual media items in response to the user scroll. The amount of scrolling used to transition between media items may be assigned to equalize the amount of scrolling space dedicated to the display of each of the media items 130. As such, the display component 770 may determine an amount of scroll corresponding to a message transition based on a division of an amount of scrolling space available to a quantity of visual media items.

In some embodiments, each received messages and/or media item may be displayed in association with the message and/or media item in the user interface for the sending client device 125. The messaging client 720 on the sending client device 125 may therefore be notified by the messaging client 720 on the receiving client device 120 that the message and/or media item has been presented to the user of the receiving client device 120. As such, the messaging component 750 may transmit a message-read notification corresponding to the second visual media item via the messaging server in response to the replacing of the first visual media item with the second visual media item.

In some embodiments, a user may configure the messaging client 720—or may use a default configuration of the messaging client 720—to not automatically download media items. This configuration may be dependent on the receiving client device 120 being on a cellular data network, with the messaging client 720 still automatically downloading media items when on a Wi-Fi network or other non-metered data network. As such, the messaging component 750 may determine that a media download preference associated with the messaging thread user interface indicates not to auto-download visual media and use a placeholder image in response to the media download preference. A placeholder image may comprise an image communicating that a media item is available for downloading but has not yet been downloaded. Where the media download preference is dependent on a data connection type, the messaging component 750 may determine that a mobile receiving client device 120 displaying the messaging thread user interface is using a cellular data connection type of data connection type and indicate that the display component 770 should use the placeholder image based on the mobile receiving client device 120 using the cellular data connection type.

Therefore, the display component 770 may replace the first visual media item with the placeholder image in response to the horizontal swipe. The user interface component 860 may receive a user download selection of the placeholder image. The messaging component 750 may download the second visual media item of the plurality of visual media items 130 in response to the user download selection. The display component 770 may replace the placeholder image with the second visual media item in the messaging thread user interface once the second visual media item has been downloaded.

Placeholder images may also be used in regards to the unitary layout 510 of media items 130. The display component 770 may replace the first visual media item with a placeholder image in response to the user scroll. The user interface component 860 may receive a user download selection of the placeholder image. The messaging component 750 may download a second visual media item of the plurality of visual media items 130 in response to the user download selection. And the display component 770 may replace the placeholder image with the second visual media item in the user interface.

Media item information associated with each of the media items 130 may be received from the sending client device 125 and/or messaging service 140 in the receiver messaging packages 110. Media item information may include a capture date for images or video, a file size, a sharing count, and any other relevant information. The media item information may be displayed in association with the media items 130. The media item information for a currently-visible media item may be displayed in association with the currently-visible media item and removed from display when a unitary layout 510 transitions to another media item. As such, the messaging component 750 may receive media item information for each of the visual media items 130 and the display component 770 may select particular media item information related to the displayed first visual media item and display the particular media item information in the messaging thread user interface in relation to the first visual media item. This transition of media item information may be performed whether the transition between media items is due to an explicit user command in relation to the transition between media items, due to an explicit user command to scroll the user interface, or due to an automatic scrolling, such as may be performed upon the reception of a new message in the messaging conversation.

The user input 865 may correspond to a user selection of a media forward control. The user interface component 860 may receive a user selection of a media forward control 460 displayed in reference to the plurality of visual media items 130. The messaging component 750 may generate a plurality of outgoing messaging packages, wherein each of the plurality of outgoing messaging packages references one of the plurality of visual media items 130, the plurality of outgoing messaging packages operative to instruct the messaging service 140 to forward the media items 130 to one or more other client devices corresponding to specified users of the messaging service 140. The messaging component 750 may transmit each of the plurality of outgoing messaging packages in sequence via the messaging server.

The messaging client 720 may be operative to display a full-size, or at least larger, view of media items that are displayed in reduced size in-line with a messaging conversation. The user input 865 may correspond to a user selection of a particular visual media item. The user interface component 860 may receive a user selection of a particular visual media item of the plurality of visual media items 130 and display an expanded view of the particular visual media item in response to the user selection. The expanded view may correspond to a larger view of the particular visual media item to allow the user of the receiving client device 120 to better examine the visual media item.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 9A illustrates one embodiment of a logic flow 900. The logic flow 900 may be representative of some or all of the operations executed by one or more embodiments described herein.

In the illustrated embodiment shown in FIG. 9A, the logic flow 900 may receive a plurality of messaging packages 110 from a messaging server at block 902.

The logic flow 900 may determine a plurality of visual media items 130 referenced by the plurality of messaging packages 110 at block 904.

The logic flow 900 may determine a visual media item layout 765 at block 906.

The logic flow 900 may display the plurality of visual media items 130 based on the visual media item layout 765 at block 908.

The embodiments are not limited to this example.

Figure 9B:
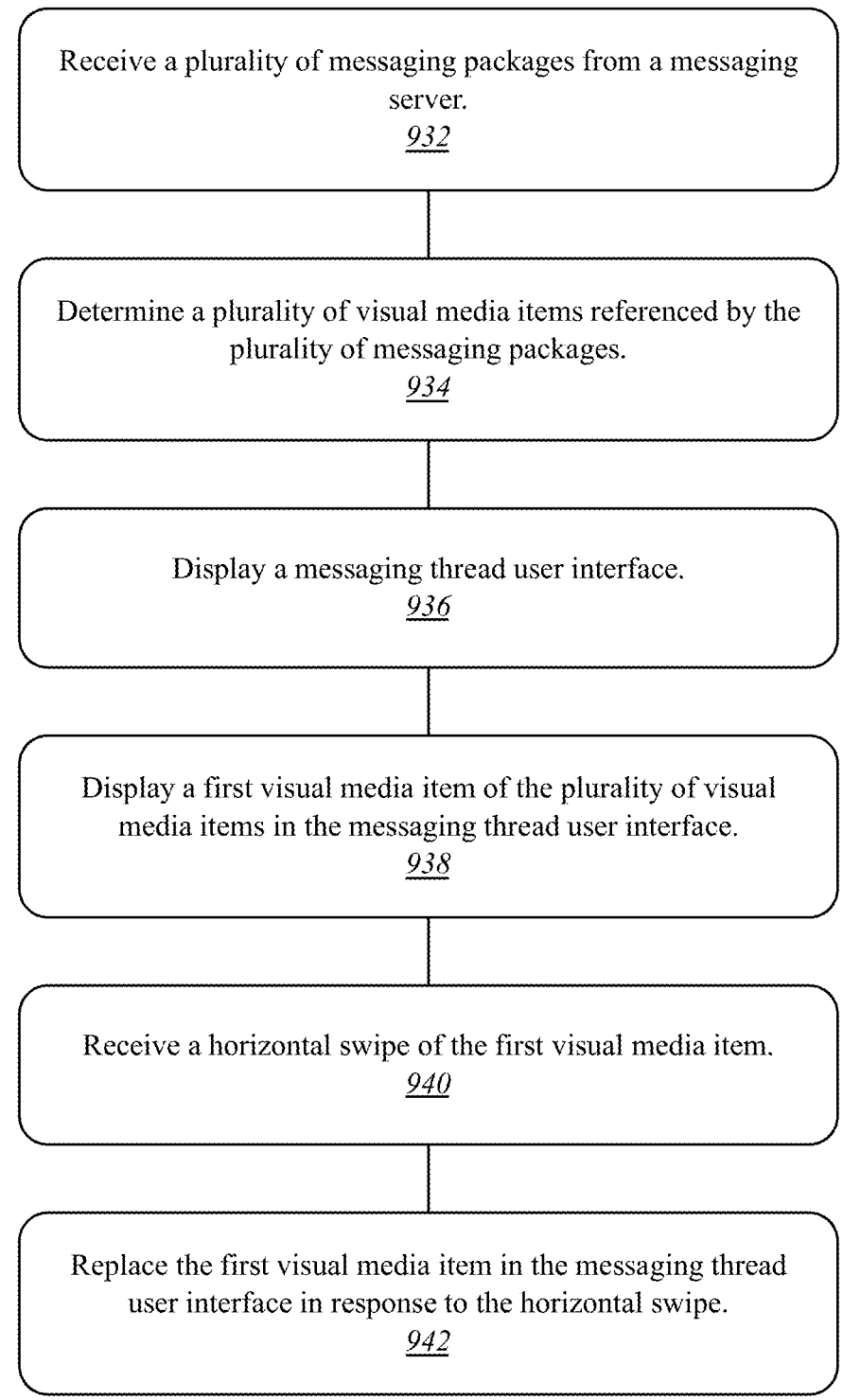
FIG. 9B illustrates an embodiment of a first logic flow for the system of FIG. 1.

FIG. 9B illustrates one embodiment of a logic flow 930. The logic flow 930 may be representative of some or all of the operations executed by one or more embodiments described herein.

In the illustrated embodiment shown in FIG. 9B, the logic flow 930 may receive a plurality of messaging packages 110 from a messaging server at block 932.

The logic flow 930 may determine a plurality of visual media items 130 referenced by the plurality of messaging packages 110 at block 934.

The logic flow 930 may display a messaging thread user interface at block 936.

The logic flow 930 may display a first visual media item of the plurality of visual media items 130 in the messaging thread user interface at block 938.

The logic flow 930 may receive a horizontal swipe of the first visual media item at block 940.

The logic flow 930 may replace the first visual media item in the messaging thread user interface in response to the horizontal swipe at block 942.

The embodiments are not limited to this example.

FIG. 9C illustrates one embodiment of a logic flow 960. The logic flow 960 may be representative of some or all of the operations executed by one or more embodiments described herein.

In the illustrated embodiment shown in FIG. 9C, the logic flow 960 may receive a plurality of messaging packages 110 from a messaging server at block 962.

The logic flow 960 may determine a plurality of visual media items 130 referenced by the plurality of messaging packages 110 at block 964.

The logic flow 960 may display a first visual media item of the plurality of visual media items 130 in a user interface at block 966.

The logic flow 960 may receive a user scroll 605 of the user interface at block 968.

The logic flow 960 may replace the first visual media item in the user interface in response to the user scroll 605 at block 970.

The embodiments are not limited to this example.

Figure 10:
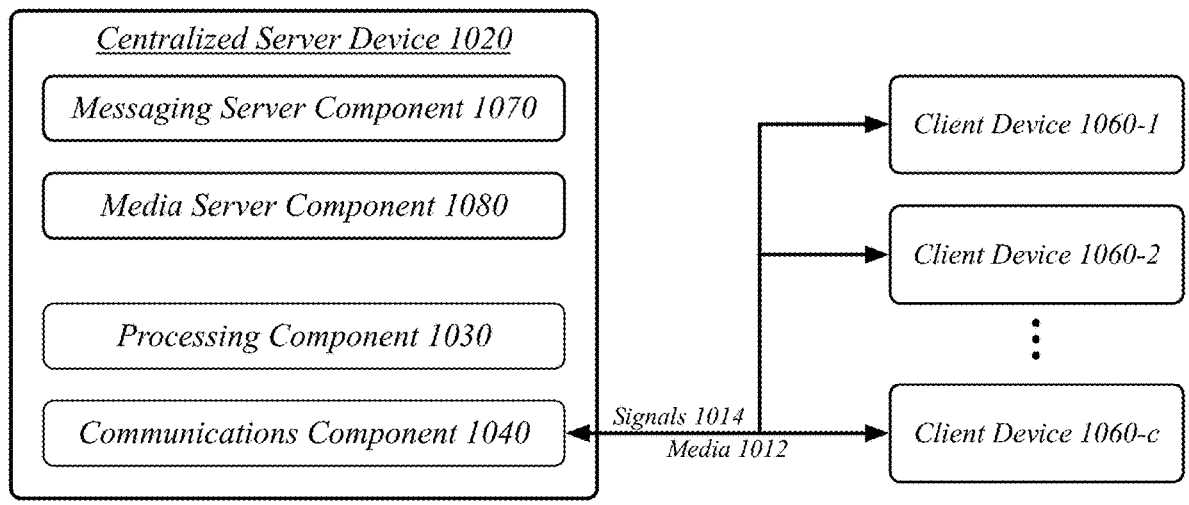
FIG. 10 illustrates an embodiment of a centralized system for the system of FIG. 1.

FIG. 10 illustrates a block diagram of a centralized system 1000. The centralized system 1000 may implement some or all of the structure and/or operations for the media display system 100 in a single computing entity, such as entirely within a single centralized server device 1020.

The centralized server device 1020 may comprise any electronic device capable of receiving, processing, and sending information for the media display system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 1020 may execute processing operations or logic for the media display system 100 using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 1020 may execute communications operations or logic for the media display system 100 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1012, 1042 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 1020 may communicate with other devices over a communications media 1012 using communications signals 1014 via the communications component 1040. The devices may be internal or external to the centralized server device as desired for a given implementation.

The centralized server device 1020 may communicate with client devices 1060. The client devices 1060 may corresponds to devices used by users of the messaging service 140 to receive, view, compose, and transmit messages, such as may include media items exchanged between users of the messaging service 140. The client devices 1060 may include the receiving client device 120 and sending client device 125.

The centralized server device may comprise a messaging server component 1070 and media server component 1080. The messaging server component may be operative to receive, store, and forward messages between messaging clients. The messaging server component may receive sender messaging packages 115 and generate and transmit the receiver messaging packages 110. The media server component 1080 may receive, store, maintain, and transmit media items 130.

Figure 11:
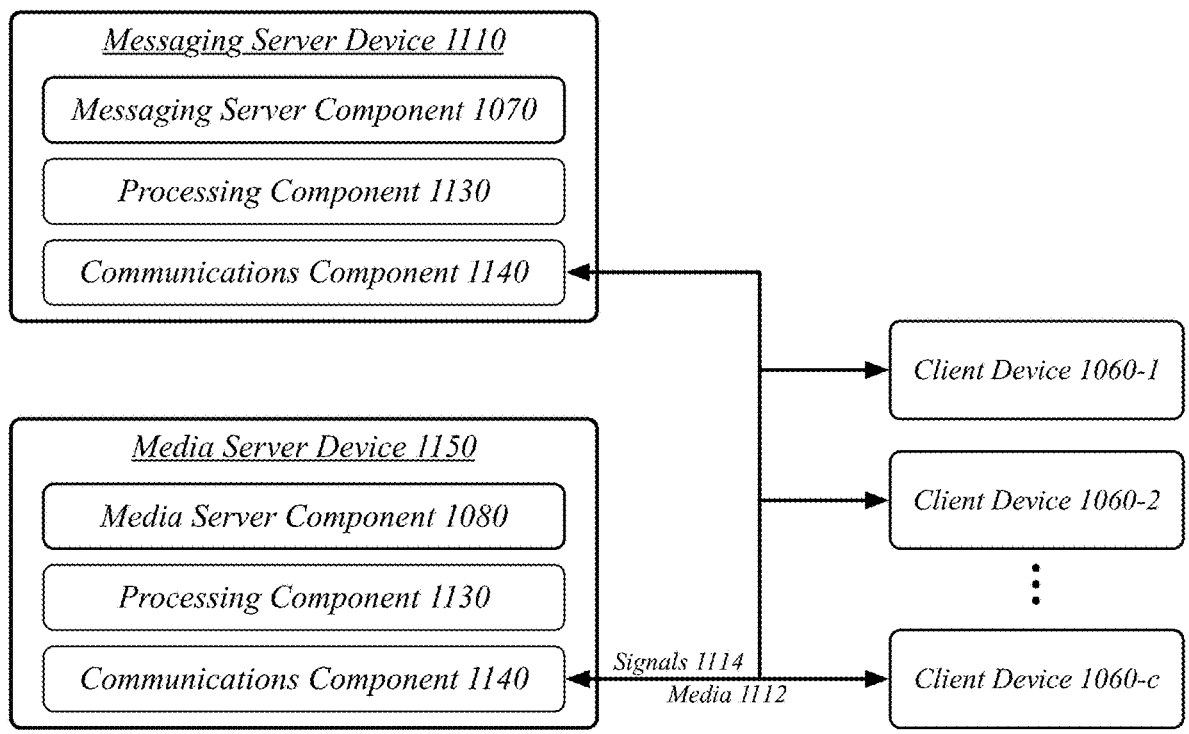
FIG. 11 illustrates an embodiment of a distributed system for the system of FIG. 1.

FIG. 11 illustrates a block diagram of a distributed system 1100. The distributed system 1100 may distribute portions of the structure and/or operations for the media display system 100 across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a messaging server device 1110 and a media server device 1150. In general, the messaging server device 1110 and the media server device 1150 may be the same or similar to the centralized server device 1020 as described with reference to FIG. 10. For instance, the server devices 1110, 1150 may each comprise a processing component 1130 and a communications component 1140 which are the same or similar to the processing component 1030 and the communications component 1040, respectively, as described with reference to FIG. 10. In another example, the server devices 1110, 1150 may communicate over a communications media 1112 using communications signals 1114 via the communications components 1140.

The messaging server device 1110 may comprise or employ one or more client programs that operate to perform various methodologies in accordance with the described embodiments. In one embodiment, for example, the messaging server device 1110 may implement the messaging server component 1070 as described with reference to FIG. 10.

The media server device 1150 may comprise or employ one or more server programs that operate to perform various methodologies in accordance with the described embodiments. In one embodiment, for example, the media server device 1150 may implement the media server component 1080 as described with reference to FIG. 10.

Figure 12:
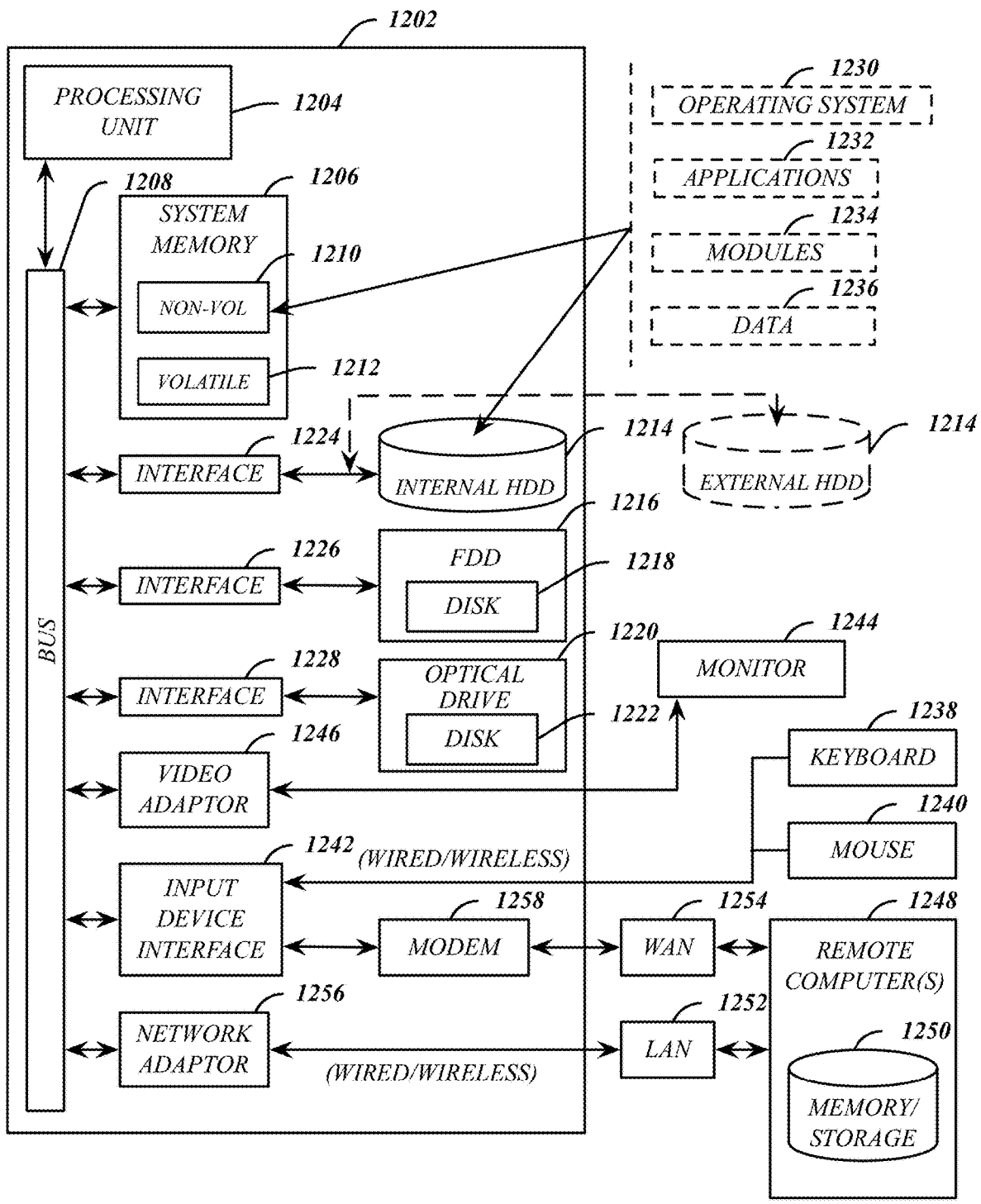
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an Athlon®, Duron® and Opteron® processors; embedded and secure processors, DragonBall® and PowerPC® processors; Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the media display system 100.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.12 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.12x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
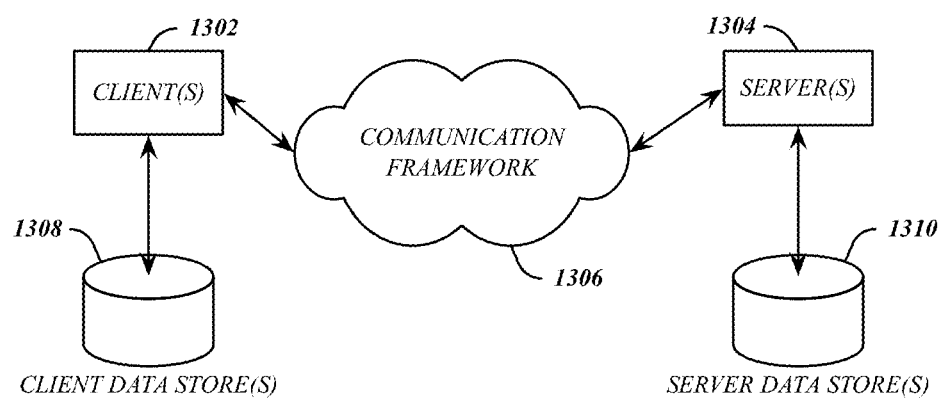
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1302 and servers 1304. The clients 1302 may implement the client device 910. The servers 1304 may implement the server device 950. The clients 1302 and the servers 1304 are operatively connected to one or more respective client data stores 1308 and server data stores 1310 that can be employed to store information local to the respective clients 1302 and servers 1304, such as cookies and/or associated contextual information.

The clients 1302 and the servers 1304 may communicate information between each other using a communication framework 1306. The communications framework 1306 may implement any well-known communications techniques and protocols. The communications framework 1306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 14:
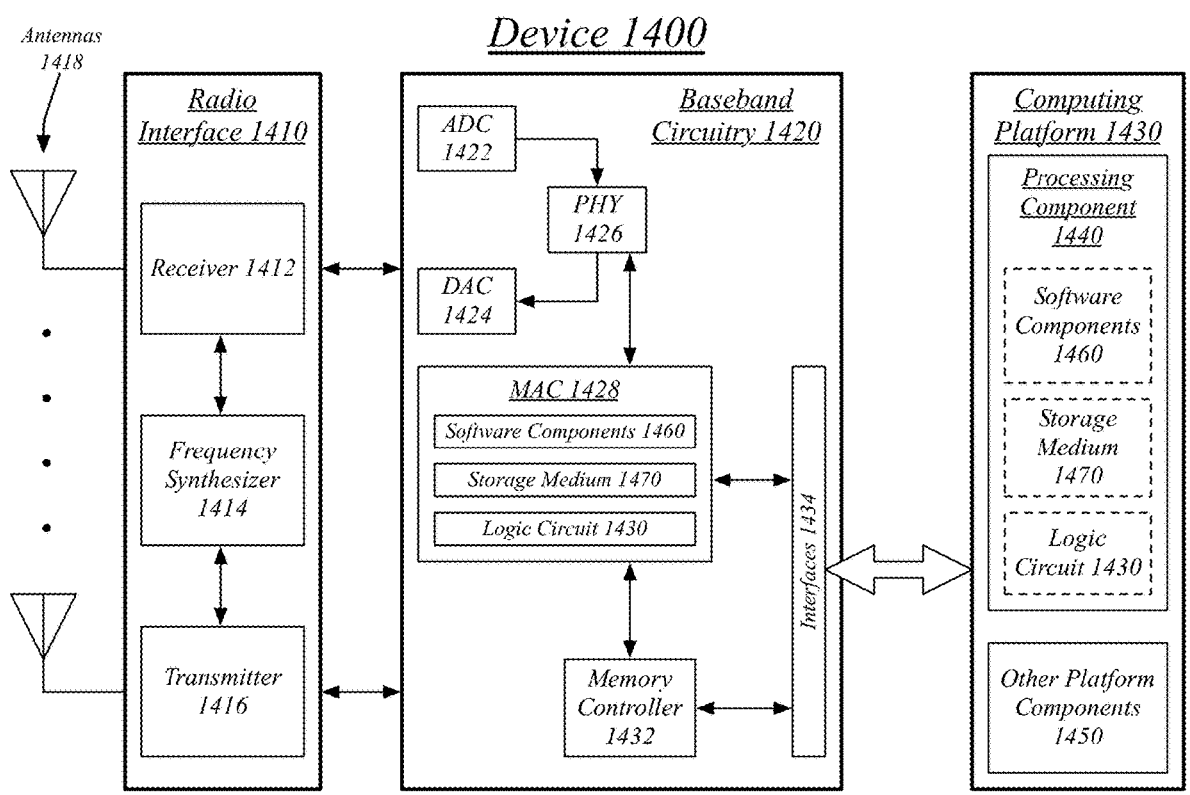
FIG. 14 illustrates an embodiment of a radio device architecture.

FIG. 14 illustrates an embodiment of a device 1400 for use in a multicarrier OFDM system, such as the media display system 100. Device 1400 may implement, for example, software components 1460 as described with reference to media display system 100 and/or a logic circuit 1430. The logic circuit 1430 may include physical circuits to perform operations described for the media display system 100. As shown in FIG. 14, device 1400 may include a radio interface 1410, baseband circuitry 1420, and computing platform 1430, although embodiments are not limited to this configuration.

The device 1400 may implement some or all of the structure and/or operations for the media display system 100 and/or logic circuit 1430 in a single computing entity, such as entirely within a single device. Alternatively, the device 1400 may distribute portions of the structure and/or operations for the media display system 100 and/or logic circuit 1430 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1456 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with processing circuit 1428 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames, such as radio frames. Alternatively or in addition, MAC processing circuit 1428 may share processing for certain of these functions or perform these processes independent of PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for the media display system 100 and logic circuit 1430 using the processing component 1440. The processing component 1440 (and/or PHY 1426 and/or MAC 1428) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired. In some embodiments, device 1400 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1400 may be implemented using single input single output (SISO) architectures. However, certain implementations may include multiple antennas (e.g., antennas 1418) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a plurality of messaging packages from a messaging server; determining a plurality of visual media items referenced by the plurality of messaging packages; determining a visual media item layout; and displaying the plurality of visual media items based on the visual media item layout.

A computer-implemented method may further comprise requesting the plurality of visual media items from a media messaging server; and receiving the plurality of visual media items from the media messaging server via a network connection to the media messaging server.

A computer-implemented method may further comprise the plurality of visual media items corresponding to a media item quantity, wherein the visual media item layout is selected from a plurality of predefined media item layouts based on the media item quantity.

A computer-implemented method may further comprise the plurality of visual media items defined as a group for inclusion in the visual media item layout in response to the plurality of visual media items being received in uninterrupted sequence from a same transmitting user account.

A computer-implemented method may further comprise wherein at least one messaging package of the received plurality of messaging packages comprises a visual media item layout definition defining the visual media item layout.

A computer-implemented method may further comprise the visual media item layout defining a panoramic combination of the plurality of visual media items.

A computer-implemented method may further comprise receiving a user selection of a media forward control displayed in reference to the plurality of visual media items; generating a plurality of outgoing messaging packages, wherein each of the plurality of outgoing messaging packages references one of the plurality of visual media items; and transmitting each of the plurality of outgoing messaging packages in sequence via the messaging server.

A computer-implemented method may further comprise receiving a user selection of a particular visual media item of the plurality of visual media items; and displaying an expanded view of the particular visual media item in response to the user selection.

An apparatus may comprise a processor circuit on a device; a messaging component operative on the processor circuit to receive a plurality of messaging packages from a messaging server and determine a plurality of visual media items referenced by the plurality of messaging packages; a media layout component operative to determine a visual media item layout; and a display component operative to display the plurality of visual media items based on the visual media item layout. The apparatus may be operative to implement any of the computer-implemented methods described herein.

A computer-implemented method may comprise receiving a plurality of messaging packages from a messaging server; determining a plurality of visual media items referenced by the plurality of messaging packages; displaying a messaging thread user interface; displaying a first visual media item of the plurality of visual media items in the messaging thread user interface; receiving a horizontal swipe of the first visual media item; and replacing the first visual media item in the messaging thread user interface in response to the horizontal swipe.

A computer-implemented method may further comprise replacing the first visual media item with a second visual media item of the plurality of visual media items in response to the horizontal swipe.

A computer-implemented method may further comprise transmitting a message-read notification corresponding to the second visual media item via the messaging server in response to the replacing of the first visual media item with the second visual media item.

A computer-implemented method may further comprise replacing the first visual media item with a placeholder image in response to the horizontal swipe; receiving a user download selection of the placeholder image; downloading a second visual media item of the plurality of visual media items in response to the user download selection; and replacing the placeholder image with the second visual media item in the messaging thread user interface.

A computer-implemented method may further comprise determining that a media download preference associated with the messaging thread user interface indicates not to auto-download visual media; and using the placeholder image in response to the media download preference.

A computer-implemented method may further comprise the media download preference dependent on a data connection type, further comprising: determining that a mobile client device displaying the messaging thread user interface is using a cellular data connection type of data connection type; and using the placeholder image based on the mobile client device using the cellular data connection type.

A computer-implemented method may further comprise receiving media item information for each of the visual media items; selecting particular media item information related to the displayed first visual media item; and displaying the particular media item information in the messaging thread user interface in relation to the first visual media item.

A computer-implemented method may further comprise the plurality of visual media items defined as a group in response to the plurality of visual media items being received in uninterrupted sequence from a same transmitting user account.

An apparatus may comprise a processor circuit on a device; a messaging component operative on the processor circuit to receive a plurality of messaging packages from a messaging server; and determine a plurality of visual media items referenced by the plurality of messaging packages; a display component operative to display a messaging thread user interface; display a first visual media item of the plurality of visual media items in the messaging thread user interface; and replace the first visual media item in the messaging thread user interface in response to a horizontal swipe; and a user interface component operative to receive the horizontal swipe of the first visual media item. The apparatus may be operative to implement any of the computer-implemented methods described herein.

A computer-implemented method may comprise receiving a plurality of messaging packages from a messaging server; determining a plurality of visual media items referenced by the plurality of messaging packages; displaying a first visual media item of the plurality of visual media items in a user interface; receiving a user scroll of the user interface; and replacing the first visual media item in the user interface in response to the user scroll.

A computer-implemented method may further comprise determining an amount of scroll corresponding to a message transition based on a division of an amount of scrolling space available to a quantity of visual media items.

A computer-implemented method may further comprise the user interface comprising a messaging thread user interface.

A computer-implemented method may further comprise the user interface comprising a multi-album user interface.

A computer-implemented method may further comprise replacing the first visual media item with a second visual media item of the plurality of visual media items in response to the user scroll.

A computer-implemented method may further comprise replacing the first visual media item with a placeholder image in response to the user scroll; receiving a user download selection of the placeholder image; downloading a second visual media item of the plurality of visual media items in response to the user download selection; and replacing the placeholder image with the second visual media item in the user interface.

A computer-implemented method may further comprise determining that a media download preference associated with the messaging thread user interface indicates not to auto-download visual media; and using the placeholder image in response to the media download preference.

A computer-implemented method may further comprise the media download preference dependent on a data connection type, further comprising: determining that a mobile client device displaying the messaging thread user interface is using a cellular data connection type of data connection type; and using the placeholder image based on the mobile client device using the cellular data connection type.

A computer-implemented method may further comprise receiving media item information for each of the visual media items; selecting particular media item information related to the displayed first visual media item; and displaying the particular media item information in the messaging thread user interface in relation to the first visual media item.

A computer-implemented method may further comprise the plurality of visual media items defined as a group in response to the plurality of visual media items being received in uninterrupted sequence from a same transmitting user account.

An apparatus may comprise a processor circuit on a device; a messaging component operative on the processor circuit to receive a plurality of messaging packages from a messaging server and determine a plurality of visual media items referenced by the plurality of messaging packages; a display component operative to display a first visual media item of the plurality of visual media items in a user interface and replace the first visual media item in the user interface in response to a user scroll; and a user interface component operative to receive a user scroll of the user interface. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving a plurality of messages from a messaging server at a messaging application on a client device, wherein two or more of the plurality of messages have at least one media item associated therewith;
   grouping a plurality of the media items associated with the messages into a unified group;
   displaying a listing of textual message content extracted from the plurality of messages in a user interface of the messaging application;
   selecting one media item from the unified group to be displayed in a unitary layout, the unitary layout displaying only the selected media item;

displaying the unitary layout with the listing of the textual message content in the user interface; and switching the media item displayed in the unitary layout to another media item from the unified group based on a vertical scroll distance of the textual message content and the unitary layout;

wherein the vertical scroll distance required to switch the displayed media item comprises a total distance between a top of the user interface and a bottom of the user interface divided by the number of media items in the unified group.

2. The computer-implemented method of claim 1, further comprising:

receiving a vertical scroll motion in the user interface; and vertically scrolling the textual message content and the unitary layout in the direction of the vertical scroll motion.

3. The computer-implemented method of claim 2 wherein the vertical scroll motion is the result of haptic contact from a user of the client device with the user interface.

4. The computer-implemented method of claim 2 wherein the vertical scroll motion is the result of contact from a pointing device within the user interface.

5. The computer-implemented method of claim 1, further comprising:

receiving an additional message;

determining that the displayed textual message content and unitary layout occupy all vertical space in the user interface;

moving the displayed textual message content and unitary layout toward the top of the user interface to make room at the bottom of the user interface to display textual message content from the additional message; and displaying textual message content from the additional message at the bottom of the user interface.

6. The computer-implemented method of claim 5, further comprising:

determining that the additional message has one or more additional media items associated therewith; and adding the one or more additional media items to the unified group of media items.

7. The computer-implemented method of claim 1, further comprising:

providing an animated transition between a previously-displayed media item and a next-displayed media item selected to be displayed in the unitary layout.

8. An apparatus comprising:

a processor; and a messaging application, operative on the processor, the messaging application performing functions comprising:

receiving a plurality of messages from a messaging server wherein two or more of the plurality of messages have at least one media item associated therewith;

grouping a plurality of the media items associated with the messages into a unified group;

displaying a listing of textual message content extracted from the plurality of received messages in a user interface of the messaging application;

selecting one media item from the unified group to be displayed in a unitary layout, the unitary layout displaying only the selected media item;

displaying the unitary layout with the listing of the textual message content in the user interface; and switching the media item displayed in the unitary layout to another media item from the unified group based on a vertical scroll distance of the textual message content and the unitary layout;

wherein the vertical scroll distance required to switch the displayed media item comprises a total distance between a top of the user interface and a bottom of the user interface divided by the number of media items in the unified group.

9. The apparatus of claim 8, the media application performing the further functions of:

receiving a vertical scroll motion in the user interface; and vertically scrolling the textual message content and the unitary layout in the direction of the vertical scroll motion.

10. The apparatus of claim 9 wherein the vertical scroll motion is the result of haptic contact from a user of the client device with the user interface or the result of contact from a pointing device within the user interface.

11. The apparatus of claim 8, the messaging application performing the further functions of:

receiving an additional message;

determining that the displayed textual message content and unitary layout occupy all vertical space in the user interface;

moving the displayed textual message content and unitary layout toward the top of the user interface to make room at the bottom of the user interface to display textual message content from the additional message; and displaying textual message content from the additional message at the bottom of the user interface.

12. The apparatus of claim 11, the messaging application performing the further functions of:

determining that the additional message has one or more additional media items associated therewith; and adding the one or more additional media items to the unified group of media items.

13. The apparatus of claim 8, the messaging application performing the further functions of:

providing an animated transition between a previously-displayed media item and a next-displayed media item selected to be displayed in the unitary layout.

14. A non-transitory, computer-readable storage medium comprising instructions that, when executed by a processor, cause a system to:

receive a plurality of messages from a messaging server at a messaging application on a client device, wherein two or more of the plurality of messages have at least one media item associated therewith;

group a plurality of the media items associated with the messages into a unified group;

display a listing of textual message content extracted from the plurality of messages in a user interface of the messaging application;

select one media item from the unified group to be displayed in the unitary layout, the unitary layout displaying only the selected media item;

display the unitary layout with the listing of the textual message content in the user interface; and switch the media item displayed in the unitary layout to another media item from the unified group based on a vertical scroll distance of the textual message content and the unitary layout;

wherein the vertical scroll distance required to switch the displayed media item comprises a total distance between a top of the user interface and a bottom of the user interface divided by the number of media items in the unified group.

15. The medium of claim 14 comprising further instructions that cause the system to:
   receive a vertical scroll motion in the user interface; and
   vertically scroll the textual message content and the unitary layout in the direction of the vertical scroll motion.

16. The medium of claim 14 comprising further instructions that cause the system to:
   receive an additional message;
   determine that the additional message has one or more additional media items associated therewith;
   add the one or more additional media items to the unified group of media items;
   determine that the displayed textual message content and unitary layout occupy all vertical space in the user interface;
   move the displayed textual message content and unitary layout toward the top of the user interface to make room at the bottom of the user interface to display textual message content from the additional message; and
   display textual message content from the additional message at the bottom of the user interface.

17. The medium of claim 14 comprising further instructions that cause the system to:
   provide an animated transition between a previously-displayed media item and a next-displayed media item selected to be displayed in the unitary layout.

18. The computer-implemented method of claim 5 wherein moving the displayed textual message content and unitary layout toward the top of the user interface causes the unitary layout to move a vertical distance sufficient to cause the media item displayed in the unitary layout to change.

19. The apparatus of claim 11 wherein moving the displayed textual message content and unitary layout toward the top of the user interface causes the unitary layout to move a vertical distance sufficient to cause the media item displayed in the unitary layout to change.

20. The medium of claim 16 wherein moving the displayed textual message content and unitary layout toward the top of the user interface causes the unitary layout to move a vertical distance sufficient to cause the media item displayed in the unitary layout to change.

* * * * *